United States Patent
Nomura et al.

[19]

[11] Patent Number: 5,877,772
[45] Date of Patent: Mar. 2, 1999

[54] GRAPHIC PROCESSING APPARATUS ALLOWING THE USER TO SPECIFY IMAGE APPEARANCE BY AUTOMATICALLY EXPRESSING DIFFERENCES IN COLOR AND HATCHING ATTRIBUTES

[75] Inventors: Takahiko Nomura; Naoki Hayashi, both of Nakai-machi, Japan

[73] Assignee: Fuji Xerox Co., Ltd., Tokyo, Japan

[21] Appl. No.: 684,834

[22] Filed: Jul. 1, 1996

[30] Foreign Application Priority Data

Sep. 8, 1995 [JP] Japan ..................................... 7-255757

[51] Int. Cl.⁶ ...................................................... G06F 15/78
[52] U.S. Cl. ............................ 345/431; 345/433; 345/430
[58] Field of Search ...................................... 345/141, 194,
345/193, 10, 150, 431, 116, 131, 133, 507,
369, 340, 362, 421, 139, 351, 352, 419,
429, 147, 432, 433, 430, 434, 418, 420,
22, 296; 382/162; 395/183.14; 358/500,
518, 520, 521, 530, 537, 515, 531; 707/3,
502, 526, 516, 528, 529, 530, 531; 33/465

[56] References Cited

U.S. PATENT DOCUMENTS

| | | | |
|---|---|---|---|
| 4,084,329 | 4/1978 | Randol ........................................ | 33/465 |
| 4,596,673 | 6/1986 | Holly ....................................... | 345/421 |
| 4,714,920 | 12/1987 | Andernach et al. ..................... | 345/139 |
| 4,724,431 | 2/1988 | Holtey et al. ............................. | 345/22 |
| 4,815,029 | 3/1989 | Barker et al. ............................. | 707/516 |
| 4,887,228 | 12/1989 | Robert ...................................... | 345/429 |
| 4,899,216 | 2/1990 | Tatsumi et al. .......................... | 358/521 |
| 5,028,991 | 7/1991 | Sekizawa et al. ....................... | 358/537 |
| 5,079,624 | 1/1992 | Sasuga et al. ........................... | 358/530 |

(List continued on next page.)

FOREIGN PATENT DOCUMENTS

| | | |
|---|---|---|
| 0 356 117 | 2/1990 | European Pat. Off. . |
| 61-090261 | 5/1986 | Japan . |
| 63-004950 | 1/1988 | Japan . |
| A-2-223275 | 9/1990 | Japan . |
| A-3-109874 | 5/1991 | Japan . |
| A-6-168310 | 6/1994 | Japan . |
| A-7-220101 | 8/1995 | Japan . |
| 2 220 331 A | 1/1990 | United Kingdom . |

OTHER PUBLICATIONS

Foley, James D. and others. "Computer Graphics: Principles and Practice," (Reading: Addison–Westley) pp. 581,589, 590, 1995.

"Illustrator Draftsman 3&2," (Washington: Government Printing Office) pp. 357,359, 1967.

"Computer Dictionary," (Redmond: Microsoft Press) pp. 89, 237, 470, 1997.

"Full–Screen, Scrollable APL2 Spreadsheet Input/Output Editor", Peter A. W. Lewis, APL Quote Quad, vol. 23. No. 3, Mar. 1993, pp. 9–14.

*Primary Examiner*—Joseph H. Feild
*Assistant Examiner*—John L. Young
*Attorney, Agent, or Firm*—Oliff & Berridge PLC

[57] ABSTRACT

A graphic processing apparatus is described which is capable of controlling the highlighting states of regions of an image by providing differences in color and hatching densities and the like to the regions in accordance with the area and the degree of importance of the region. This allows high quality coloring and hatching to be easily performed. The graphic processing apparatus has a memory for temporarily storing the image; a region extractor that extracts a plurality of regions to be painted with a color from the stored image; a region color determiner that determines region colors to be applied to the extracted regions; and an output image generator that generates an image having the color attributes applied to the extracted regions of the stored image. The region colors are differentiated from each other by differences in color attributes from among the regions in accordance with the areas of the individual regions each to be painted with a color. When used in a digital photocopier environment, an image that is scanned and stored in memory can have regions, selected by a user through a graphical user interface, colored or hatched, the colors/hatching applied at the same time to the regions and the modified image printed.

43 Claims, 17 Drawing Sheets

U.S. PATENT DOCUMENTS

| | | | |
|---|---|---|---|
| 5,128,748 | 7/1992 | Murakami et al. | 358/500 |
| 5,136,399 | 8/1992 | Aoyama | 358/296 |
| 5,138,697 | 8/1992 | Yamamoto et al. | 345/420 |
| 5,142,355 | 8/1992 | Fujima | 358/515 |
| 5,202,935 | 4/1993 | Kanamori et al. | 382/162 |
| 5,204,948 | 4/1993 | Kato | 358/520 |
| 5,258,831 | 11/1993 | Kato et al. | 358/500 |
| 5,267,333 | 11/1993 | Aono et al. | 382/166 |
| 5,289,296 | 2/1994 | Yamada | 358/530 |
| 5,296,946 | 3/1994 | Kadowaki et al. | 358/531 |
| 5,305,435 | 4/1994 | Bronson | 345/351 |
| 5,317,648 | 5/1994 | Sawada et al. | 382/162 |
| 5,337,402 | 8/1994 | Kitagawa et al. | 345/433 |
| 5,343,312 | 8/1994 | Hibi et al. | 358/520 |
| 5,351,183 | 9/1994 | Sasaki et al. | 358/462 |
| 5,375,125 | 12/1994 | Oshima et al. | 395/183.14 |
| 5,375,194 | 12/1994 | Hori et al. | 345/433 |
| 5,387,983 | 2/1995 | Sugiura et al. | 358/434 |
| 5,392,428 | 2/1995 | Robins | 707/3 |
| 5,408,339 | 4/1995 | Sasaki et al. | 358/462 |
| 5,412,400 | 5/1995 | Takahara et al. | 345/340 |
| 5,437,008 | 7/1995 | Gay et al. | 707/502 |
| 5,502,800 | 3/1996 | Kitagawa et al. | 345/433 |
| 5,513,310 | 4/1996 | Megard et al. | 345/352 |

| HUE \ DEGREE OF IMPORTANCE | HIGH | MEDIUM | LOW |
|---|---|---|---|
| RED | R255/G100/B100 (DARK RED) | R255/G180/B180 (MEDIUM RED) | R255/G235/B235 (LIGHT RED) |
| YELLOW-RED | R200/G128/B0 (DARK YELLOW-RED) | R255/G171/B89 (MEDIUM YELLOW-RED) | R255/G222/B171 (LIGHT YELLOW-RED) |
| YELLOW | R220/G220/B0 (DARK YELLOW) | R255/G255/B181 (MEDIUM YELLOW) | R255/G255/B214 (LIGHT YELLOW) |
| ... | ... | ... | ... |

FIG.13

GRAPHIC PROCESSING APPARATUS ALLOWING THE USER TO SPECIFY IMAGE APPEARANCE BY AUTOMATICALLY EXPRESSING DIFFERENCES IN COLOR AND HATCHING ATTRIBUTES

BACKGROUND OF THE INVENTION

1. Field of the Invention

In general, the present invention relates to a graphic processing apparatus. In particular, the present invention relates to a graphic processing apparatus which is capable of painting colors on a graphic or hatching a graphic by expressing differences in color/hatching density and varying the color tone in accordance with simple commands entered by the user.

2. Description of the Related Art

In recent years, by virtue of the popularization of the DTP (Desk Top Publishing) technologies and color printers, colored texts can be created with ease even at a general office. In addition, a full-color digital copy machine having a function to process texts and graphics has been developed and implemented. An example of such a full-color digital copy machine is disclosed in Japanese Patent Laid-open No. Hei 2-223275 (1990). By utilizing these technologies, a composer having knowledge and experience in the coloring field can compose texts by making a variety of studies of text composition over a long time without hurry in order to create high-quality text which reflects the intention of the composition.

In many cases, however, the general user does not know which part of text should be painted with a color in order to make the text easy to read. Even if parts of the text are each painted with a color on a trial-and-error basis, the resulting text is poor-looking and difficult to read and, thus, can not be said to have a high quality.

On the contrary, technologies disclosed in documents such as Japanese Patent Laid-open Nos. Hei 3-109874 (1991) and Hei 6-168310 (1994) allow improvement of the coloring and appearance of text to be implemented with ease even by a general user who has a lack of knowledge and design sense with respect to color arrangement.

The technology disclosed in Japanese Patent Laid-open No. Hei 3-109874 is used to provide complementary colors to characters included in a displayed color picture. However, its function to process and output text with a high-quality design to reflect the composition intention of the user is not adequate. On the other hand, the technology disclosed in Japanese Patent Laid-open No. Hei 6-168310 is a technology for converting input text into a layout and color arrangement of a finished image thereof which matches the objective of the composer. However, the composer can specify only the purpose and impression of the coloring. The composer can not step into things such as details of the coloring and the highlighting of regions of a picture in order to reflect the intention of the composer.

According to an invention disclosed in Japanese Patent Laid-open No. Hei 7-220101 (1995) with the title Text Processing Apparatus, a color-arrangement function which can be executed by merely entering simple design commands such as "Coloring," "Background Coloring" and "Emphasis-Relation" is proposed. Even with this technology, the composer can not step into the area, the degree of importance and other attributes of a region to be painted with a color in order to paint a color on the region in accordance with the attributes thereof. As a result, the processing is ended with coloring from a theoretical configuration/structure of a graph.

At any rate, arrangement of colors in accordance with the area and the degree of importance of a region to be painted with a color, which area and degree of importance are the basic attributes of coloring, is not taken into consideration no matter which technology is utilized. In many cases, a portion of a manuscript that should not be highlighted in accordance with the desire of the composer appears adversely as an emphasized portion. Such cases are a problem which remains to be solved.

The above description holds true of hatching of text. Hatching carried out without taking a way of highlighting a region based on hatching design/pattern into consideration can give rise to a problem that a region which should not be highlighted in accordance with the desire of the composer adversely appears as a highlighted area due to an effect of the hatching density.

SUMMARY OF THE INVENTION

The present invention addresses a variety of problems described above. It is an object of the present invention to provide a graphic processing apparatus which is capable of controlling the highlighting state of a region by providing differences in color and hatching densities and the like in accordance with the area and the degree of importance of the region so as to allow high-quality coloring and hatching to be carried out with ease. It is another object of the present invention to provide a graphic processing apparatus which allows high-quality coloring and hatching to be carried out with ease even in the case in which regions to be provided with the same colors and the same design/pattern of hatching are organized into categories.

In order to achieve the objects described above, a graphic processing apparatus according to a 1st aspect of the present invention comprises: manuscript-picture holding means for temporarily storing a manuscript picture; region extracting means for extracting a region to be painted with a color from the manuscript picture temporarily stored in the manuscript-picture holding means; region-color determining means for determining region colors to be painted on a plurality of regions extracted by the region extracting means which region colors are differentiated from each other by differences in color attributes among said individual regions in accordance with the areas of the regions each to be painted with a color; and output-picture generating means for generating an output picture for said manuscript picture temporarily stored in the manuscript-picture holding means by providing color attributes determined by the region-color determining means to the regions extracted by the region extracting means.

In addition, a graphic processing apparatus according to a 2nd aspect of the present invention comprises: manuscript-picture holding means for temporarily storing a manuscript picture; region extracting means for extracting a region to be painted with a color from the manuscript picture temporarily stored in the manuscript-picture holding means; importance-degree-request receiving means for determining degrees of importance for a plurality of regions extracted by the region extracting means which degrees of importance are used as criteria for highlighting the individual regions each to be painted with a color; region-color determining means for determining region colors to be painted on the regions extracted by the region extracting means which region colors are differentiated from each other by differences in color attributes among said individual regions in accordance with said degrees of importance determined by the importance-degree-request receiving means for the regions each to be painted with a color; and output-picture generating means for generating an output picture for said manuscript picture temporarily stored in the manuscript-picture holding means by providing color attributes determined by the region-color determining means to said regions extracted by the region extracting means.

In addition, in a graphic processing apparatus according to a 3rd aspect of the present invention, the region-color determining means determine region colors differentiated from each other by differences in color attribute for a plurality of regions extracted by the region extracting means each to be painted with a color in accordance with both the areas of the individual regions each to be painted with a color and the degrees of importance determined by the importance-degree-request receiving means for the regions.

In addition, in a graphic processing apparatus according to a 4th aspect of the present invention, the differences in color attribute used by the region-color determining means for differentiating region colors from each other include at least one of a difference in density, a difference in chroma and a difference in hue.

In addition, a graphic processing apparatus according to a 5th aspect of the present invention comprises: manuscript-picture holding means for temporarily storing a manuscript picture; region extracting means for extracting a plurality of regions to be hatched from the manuscript picture temporarily stored in the manuscript-picture holding means; hatching-type determining means for determining hatching designs and hatching patterns of the regions extracted by the region extracting means which hatching designs and hatching patterns are differentiated from each other by their differences in density attributes in accordance with the areas of the individual regions to be hatched; and output-picture generating means for generating an output picture for said manuscript picture temporarily stored in the manuscript-picture holding means by providing hatching designs and hatching patterns determined by the hatching determining means to the regions extracted by the region extracting means.

In addition, a graphic processing apparatus according to a 6th aspect of the present invention comprises: manuscript-picture holding means for temporarily storing a manuscript picture; region extracting means for extracting a plurality of regions to be hatched from the manuscript picture temporarily stored in the manuscript-picture holding means; importance-degree-request receiving means for determining degrees of importance for said regions extracted by the region extracting means which degrees of importance are used as criteria for highlighting the individual regions to be hatched; hatching-type determining means for determining hatching designs and hatching patterns for the regions extracted by the region extracting means which hatching designs and hatching patterns are differentiated from each other by their differences in density in accordance with said degrees of importance determined by the importance-degree-request receiving means for the individual regions to be hatched; and output-picture generating, means for generating an output picture for said manuscript picture temporarily stored in the manuscript-picture holding means by providing hatching designs and hatching patterns determined by the hatching-type determining means to the regions extracted by the region extracting means.

In addition, in a graphic processing apparatus according to a 7th aspect of the present invention, said hatching-type determining means described above determine hatching designs and hatching patterns differentiated from each other by differences in density attribute for a plurality of regions extracted by the region extracting means to be hatched in accordance with both the areas of the regions and the degrees of importance determined by said importance-degree-request receiving means for the individual regions.

In addition, in a graphic processing apparatus according to an 8th aspect of the present invention, the region-color determining means handle a plurality of regions as one of categories, determine a characteristic of each of the categories in accordance with at least the areas and degrees of importance of all said regions included in said category and determine region colors for the categories which region colors are differentiated from each other by differences in color attributes among the categories in accordance with the characteristics of the categories.

In addition, in this case, in a graphic processing apparatus according to a 9th aspect of the present invention, the hatching-type determining means handle a plurality of regions as one of categories, determine a characteristic of each of the categories in accordance with at least the areas and the degrees of importance of all said regions included in the category and determine hatching designs and hatching patterns for the categories which hatching designs and hatching patterns are differentiated from each other by their differences in density attribute among said categories in accordance with the characteristics of the categories.

In addition, in this case, in a graphic processing apparatus according to a 10th aspect of the present invention, the characteristic of each of the categories is determined in accordance with a sum of the areas of all the regions included in the category. In a graphic processing apparatus according to a 11th aspect of the present invention, on the other hand, the characteristic of each of the categories is determined in accordance with a largest area among all the regions included in the category.

In addition, in a graphic processing apparatus according to a 12th aspect of the present invention, the hatching-type determining means differentiate density attributes of the hatching designs and hatching patterns from each other among regions by at least one of a difference in dot density, a difference in hatching segment gap, a difference in hatching-line thickness and a difference in hatching-overlap count.

In addition, in a graphic processing apparatus according to a 13th aspect of the present invention, the hatching-type determining means differentiate density attributes of the hatching designs and hatching patterns from each other among regions by selecting hatching types having densities different from each other.

In the graphic processing apparatus having a variety of characterizing features provided by the present invention, first of all, a manuscript to undergo a graphic coloring process is read in by a scanner, an editor or the like, and a manuscript picture thereof is temporarily stored in a manuscript-picture holding means. A region extracting means extracts regions each to be painted with a color from the manuscript picture temporarily stored in the manuscript-picture holding means. That is to say, regions of a manuscript picture to undergo coloring or hatching are extracted by the region extracting means. The regions of a manuscript picture to undergo coloring or hatching are extracted in accordance with information in the manuscript or information entered by the composer. Commands entered by the composer include not only a command for specifying a region to undergo coloring or hatching but also a command for requesting that regions to undergo the same coloring or the same hatching be categorized into a group of regions.

Subsequently, a region-color determining means determines region colors which are differentiated from each other by differences in color attribute among the regions in accordance with the areas of the individual regions. An output-picture generating means then generates an output picture for the manuscript picture temporarily stored in the manuscript-picture holding means by providing color attributes determined by the region-color determining means to the regions in the output picture which regions have been extracted by the region extracting means.

For that reason, the areas of regions are computed and, in accordance with the computed areas, the region-color determining means identifies differences in density, chroma and phase among colors to be given to the regions and differentiates the region colors by combination of these color attributes, or the hatching determining means identifies differences in hatching density. In either case, the differences are then used for determining region colors or hatching designs and hatching patterns for the regions. In addition, if a color or a hatching design/pattern is to be determined for each category, either the total area of all regions included in a category or a largest area among regions included in a category is used to represent the region area of the category. In addition, the degree of importance input from the importance-degree-request receiving means is used for determining a region color and the hatching design/pattern in accordance with a request for the degree of importance for each region and differences in degree of importance among elements of a graph. Finally, the input-picture generating means generates a text picture with regions thereof painted with the determined colors and outputs text which has undergone high-quality coloring and hatching.

In order to implement the processes described above in the graphic processing apparatus provided by the present invention, the composer (that is, the user) merely specifies regions in text each to be painted with a color and specifies proper colors for regions to undergo coloring. By doing so, colors matching the areas of the regions in the text are painted on the regions so that the highlighting state of the regions each painted with a color can be kept uniform. As a result, high-quality colored text can be obtained.

In addition, the user merely specifies regions in text to be painted with colors and specifies proper colors for regions to undergo coloring and then specifies the degrees of importance for the regions in order to implement coloring that matches the degrees of importance of the regions in the text. In this case, the highlighting state of a region to undergo coloring is determined by its degree of importance. As a result, high-quality colored text that reflects the intention of the user can be obtained.

In addition, by specifying regions in text each to be painted with a color and the degrees of importance of the regions as an alternative, it is possible to implement coloring which takes both the areas and the degrees of importance of the regions into consideration. Accordingly, the highlighting states of regions based on the degrees of importance can be determined independently of the areas of the regions each to be painted with a color. As a result, high-quality colored text that reflects the intention of the user can be obtained.

As for specification of coloring, by decreasing the density for a region with a large area and raising the density for a region with a small area, the highlighting states of regions each to be painted with a color can be kept uniform. As an alternative, the highlighting states of regions each to be painted with a color can be controlled by decreasing the density for a region with a low degree of importance and raising the density for a region with a high degree of importance. As a result, high-quality colored text can be obtained.

In addition, as another way of specifying coloring, the chroma for a region with a large area is lowered while the chroma for a region with a small area is increased in order to keep the highlighting states of regions each to be painted with a color uniform. As an alternative, the highlighting states of regions each to be painted with a color can be controlled by decreasing the chroma for a region with a low degree of importance and raising the chroma for a region with a high degree of importance. As a result, high-quality colored text can be obtained.

In addition, as still another way of specifying coloring, the density is lowered and a non-vivid color such as blue or green is used for a region with a large area while the density is increased and a vivid color such as red or yellow is used for a region with a small area in order to keep the highlighting states of regions each to be painted with a color uniform. As an alternative, the highlighting states of regions each to be painted with a color can be controlled by decreasing the chroma and using a non-vivid color for a region with a low degree of importance or raising the chroma and using a vivid color for a region with a high degree of importance. As a result, high-quality colored text can be obtained.

In addition, as a still further way of specifying coloring, the chroma and the density for a region with a large area are lowered while the chroma and the density for a region with a small area are increased in order to keep the highlighting states of regions each to be painted with a color uniform. As an alternative, the highlighting states of regions each to be painted with a color can be controlled by decreasing the density for a region with a large area but raising the density for a region with a small area and by decreasing the chroma for a region with a low degree of importance but raising the chroma for a region with a high degree of importance. As a result, colored text with an even higher quality can be obtained.

In addition, as still another way of specifying coloring, the density is lowered and a non-vivid color such as blue or green is used for a region with a large area while the density is increased and a vivid color such as red or yellow is used for a region with a small area in order to keep the highlighting states of regions each to be painted with a color uniform. As an alternative, the highlighting states of regions each to be painted with a color can be controlled by decreasing the density for a region with a large area but increasing the density for a region with a small area and using a non-vivid color for a region with a low degree of importance and using a vivid color for a region with a high degree of importance. As a result, another kind of high-quality colored text can be obtained.

In addition, as still another way of specifying coloring, the chroma is lowered and a non-vivid color such as blue or green is used for a region with a large area and while the chroma is increased and a vivid color such as red or yellow is used for a region with a small area in order to keep the highlighting states of regions each to be painted with a color uniform. As an alternative, the highlighting states of regions each to be painted with a color can be controlled by decreasing the chroma for a region with a large area but increasing the chroma for a region with a small area and using a non-vivid color for a region with a low degree of importance but using a vivid color for a region with a high degree of importance. As a result, another kind of high-quality colored text can be obtained.

In addition, as a still further way of specifying coloring, the chroma and the density for a region with a large area are lowered while the chroma and the density for a region with a small area are increased in order to keep the highlighting states of regions each to be painted with a color uniform. As an alternative, the highlighting states of regions each to be painted with a color can be controlled by decreasing the chroma for a region with a large area but increasing the chroma for a region with a small area and using a non-vivid color for a region with a low degree of importance and using a vivid color for a region with a high degree of importance. As a result, high-quality colored text can be obtained.

In addition, as a still further way of specifying hatching designs and patterns, typically, by changing the hatching design/pattern in accordance with the area of a region in text, the hatching can be carried out with the area of each region taken into consideration and the highlighting states of regions each to be painted with a color can be kept uniform independently of the areas of regions to be hatched. As a result, high-quality hatched text can be obtained.

In addition, as a still further way of specifying hatching designs and patterns, the composer specifies regions in text to be hatched or proper hatching designs and patterns for regions to be hatched and degrees of importance of the regions. In this way, hatching which matches the degree of importance of each region can be carried out and the highlighting state of each hatched region can be determined in accordance with the degree of importance thereof. As a result, high-quality hatched text which reflects the intention of the composer can be obtained.

In addition, as a still further way of specifying hatching designs and patterns, by specifying degrees of importance of the regions to be hatched, hatching which matches the degree of importance of each region can be carried out and the highlighting state of each hatched region can be determined in accordance with the degree of importance thereof independently of the area of the hatched region. As a result, high-quality hatched text which reflects the intention of the composer can be obtained.

In addition, as a still further way of specifying hatching designs and patterns, by collectively specifying areas and degrees of importance of categories, the highlighting states of the categories can be made uniform or the highlighting states of the categories can be controlled in accordance with the degree of importance. In this case, by using the sum of areas of all regions included in each category to represent the areas of the categorized regions, the highlighting states of the categories as a whole can be made uniform.

In addition, as a still further way of specifying hatching designs and patterns, by using the largest area among all regions included in each category to represent the areas of the categorized regions, the highlighting states of majority regions in the categories can be made uniform.

In addition, as a still further way of specifying hatching designs and patterns, by decreasing the dot density for a region with a large area and increasing the dot density for a region with a small area, the highlighting states of hatched regions can be kept uniform. As an alternative, the highlighting states of the regions can be controlled by decreasing the dot density for a region with a low degree of importance and increasing the dot density for a region with a high degree of importance. As a result, high-quality hatched text can be obtained.

When hatching is carried out, by widening the hatching segment gap for a region with a large area and narrowing the hatching segment gap for a region with a small area, the highlighting states of hatched regions can be kept uniform. As an alternative, the highlighting states of the regions can be controlled by narrowing the hatching segment gap for a region with a high degree of importance and widening the hatching segment gap for a region with a low degree of importance. As a result, high-quality hatched text can be obtained.

In addition, in another example of hatching, the number of hatching overlaps is decreased for a region with a large area while the number of hatching overlaps is increased for a region with a small area in order to keep the highlighting states of the hatched regions uniform. As an alternative, the highlighting states of the regions can be controlled by increasing the number of hatching overlaps for a region with a high degree of importance and decreasing the number of hatching overlaps for a region with a low degree of importance. As a result, high-quality hatched text can be obtained.

In addition, in still another example of hatching, the hatching density is decreased for a region with a large area while the hatching density is increased for a region with a small area in order to keep the highlighting states of the hatched regions uniform. As an alternative, the highlighting states of the regions can be controlled by increasing the hatching density for a region with a high degree of importance and decreasing the hatching density for a region with a low degree of importance. As a result, high-quality hatched text can be obtained.

It is obvious from the above description that, according to the present invention, the composer (that is, the user) merely specifies regions in text each to be painted with a color or specifies proper colors for regions to undergo coloring. By doing so, colors matching the areas of the regions in the text are applied to the regions so that the highlighting states of the colored regions can be kept uniform. As a result, high-quality colored text can be obtained.

In addition, the user merely specifies regions in text each to be painted with a color or specifies proper colors for regions to undergo coloring and then specifies the degrees of importance for the regions in order implement coloring that matches the degrees of importance of the regions in the text. In this case, the highlighting state of a region to undergo coloring is determined by its degree of importance. As a result, high-quality colored text that reflects the intention of the user can be obtained.

In addition, by specifying regions in text each to be painted with a color and the degrees of importance of the regions as an alternative, it is possible to implement coloring which takes the areas and the degrees of importance of the regions into consideration. Accordingly, the highlighting states of regions based on the degrees of importance can be determined independently of the areas of the regions each to be painted with a color. As a result, high-quality colored text that reflects the intention of the user can be obtained.

Further, the density or the chroma is lowered or a non-vivid color such as blue or green is used for a region with a large area while the density or the chroma is increased or a vivid color such as red or yellow is used for a region with a small area in order to keep the highlighting states of regions each to be painted with a color uniform. As an alternative, the highlighting states of regions each to be painted with a color can be controlled by decreasing the density or the chroma or using a non-vivid color such as blue or green for a region with a lower degree of importance while increasing the density or the chroma or using a vivid color such as yellow or red for a region with a high degree of importance. As a result, high-quality colored text can be obtained.

In addition, typically, by changing the type (design and pattern) of hatching in accordance with the area of a region in text, the hatching can be carried out with the area of each region taken into consideration and the highlighting states of regions each to be painted with a color can be kept uniform independently of the areas of regions to be hatched. As a result, high-quality hatched text can be obtained.

In addition, the composer specifies regions in text to be hatched or proper types (design and pattern) of hatching for regions to be hatched and degrees of importance of the regions. In this way, hatching which matches the degree of importance of each region can be carried out and the highlighting state of each hatched region is determined in accordance with the degree of importance thereof. As a result, high-quality hatched text which reflects the intention of the composer can be obtained.

Still further, the composer specifies regions in text to be hatched and degrees of importance of the regions. In this way, hatching which matches the area and the degree of importance of each region can be carried out and the highlighting state of each region to be hatched is determined in accordance with the degree of importance thereof independently of the area of the region. As a result, high-quality hatched text which reflects the intention of the composer can be obtained.

In addition, by collectively specifying areas and degrees of importance of categorized regions and differentiating color attributes of regions in categories, the highlighting states of the categories can be made uniform or the highlighting state of the categories can be controlled in accordance with the degree of importance.

In addition, by collectively specifying areas and degrees of importance of categorized regions and differentiating hatching-density attributes of regions in categories, the highlighting states of the categories can be made uniform or the highlighting state of the categories can be controlled in accordance with the degree of importance.

In this case, by using the sum of areas of all regions included in a category to represent the areas of the categorized regions, the highlighting states of the categories as a whole can be made uniform.

In addition, by using the largest area among all regions included in a category to represent the areas of the categorized regions, the highlighting states of the categories as a whole can be made uniform.

In addition, by decreasing the dot density, increasing the hatching segment gap, or reducing the number of hatching overlaps for a region with a small area and increasing the dot density, decreasing the hatching segment gap, or increasing the number of hatching overlaps for a region with a large area, the highlighting states of hatched regions can be kept uniform. As an alternative, the highlighting states of the regions can be controlled by decreasing the dot density, increasing the hatching segment gap, or reducing the number of hatching overlaps for a region with a low degree of importance and increasing the dot density, decreasing the hatching segment gap, or increasing the number of hatching overlaps for a region with a high degree of importance. As a result, high-quality hatched text can be obtained.

Further, by increasing the hatching density for a region with a small area and decreasing the hatching density for a region with a large area, the highlighting states of hatched regions can be kept uniform. As an alternative, the highlighting states of the regions can be controlled by decreasing the hatching density for a region with a low degree of importance and increasing the hatching density for a region with a high degree of importance. As a result, high-quality hatched text can be obtained.

BRIEF DESCRIPTION OF THE DIAGRAMS

FIG. 13 is a diagram used for explaining a 1st example of color-arrangement rules stored in a color-arrangement-rule holding unit 104 of the 3rd embodiment;

DESCRIPTION OF THE PREFERRED EMBODIMENTS

The present invention will become apparent from the following detailed description of preferred embodiments with reference to accompanying diagrams.

[First Embodiment]

Figure 1:
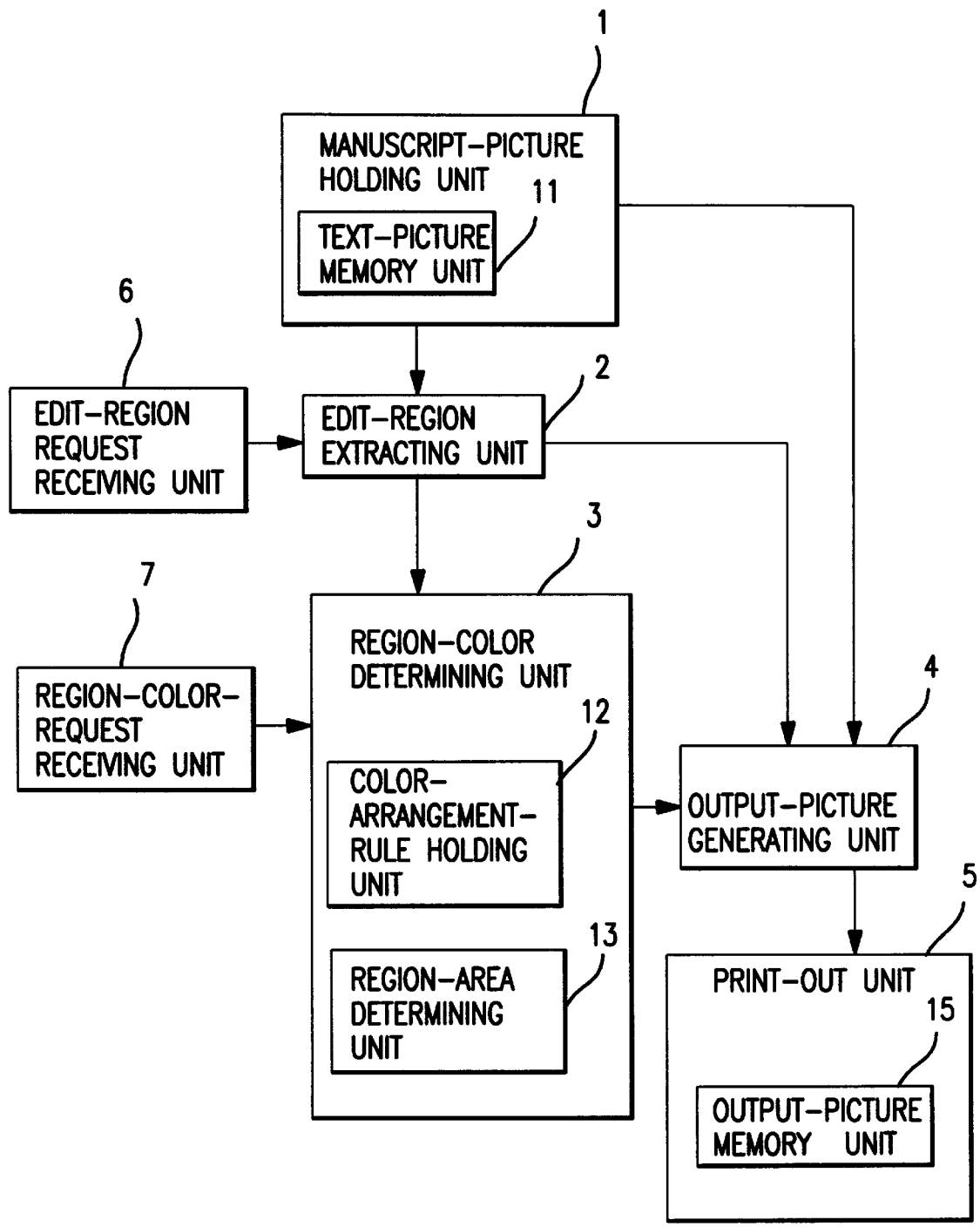
FIG. 1 is a diagram showing an overall system configuration of a graphic processing apparatus as implemented by a 1st embodiment in accordance with the present invention.

FIG. 1 is a diagram showing an overall system configuration of a graphic processing apparatus as implemented by a 1st embodiment in accordance with the present invention. Reference numeral 1 shown in the figure is a manuscript-picture holding unit whereas reference numeral 2 denotes an edit-region extracting unit. Reference numerals 3 and 4 are a region-color determining unit and an output-picture generating unit respectively. Reference numeral 5 denotes a print-out unit whereas reference numeral 6 is an edit-region-request receiving unit. Reference numerals 7 and 11 denote a region-color-request receiving unit and a text-picture memory unit respectively. Reference numeral 12 is a color-arrangement-rule holding unit whereas reference numeral 13 is a region-area determining unit. Reference numeral 15 denotes an output-picture memory unit.

Next, system components composing the graphic processing apparatus are explained by also describing a case in which the graphic processing apparatus is applied to a copy machine as an application example. In the case of the copy machine (strictly speaking, the digital copy machine) to which the graphic processing apparatus is applied, for example, the user specifies, among other things, regions in a text picture each to be painted with a color and colors for the specified regions or regions to be painted with the same color. In response to the requests made by the user, the system components composing the graphic processing apparatus operate to determine the density, chroma and hue in accordance with the areas of the regions each to be painted with a color and generates and outputs a high-quality colored picture.

The manuscript-picture holding unit 1 includes the text-picture memory unit 11. Text to be processed is read in by an image scanner and text-picture data read in by the image scanner is temporarily stored in the text-picture memory unit 11 as digital color picture data.

In an operation to read in text carried out by the image scanner employed in the copy machine, a read unit, which comprises a light source and the image scanner, applies a light generated by the light source to a thin long region in a main scanning (horizontal or short-side) direction while relatively shifting the read position on a text picture in an auxiliary scanning (vertical or long-side) direction. A light reflected by a region being scanned is converged by a lens before being supplied to a CCD image sensor through R (red), G (green) and B (blue) filters. The CCD image sensor converts the reflected light into an electrical signal which conveys information on the intensity of the reflected light. The information on the intensity of the reflected light is converted into multi-value digital data for a color picture by an AD converter and temporarily stored in the text-picture memory unit 11 of the manuscript-picture holding unit 1.

Figure 2:
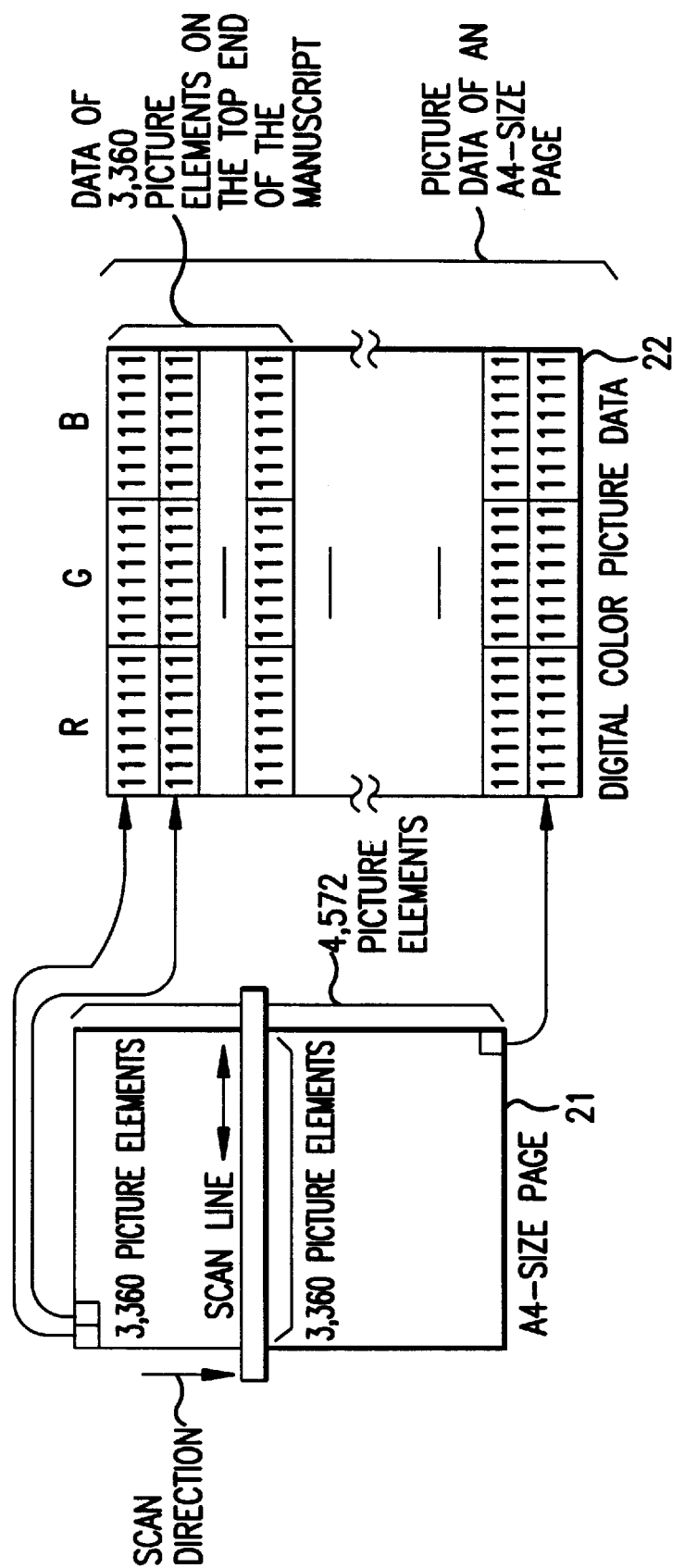
FIG. 2 is a diagram used for explaining a format for expressing color picture data stored in a text-picture memory unit.

FIG. 2 is a diagram used for explaining a format for expressing the color picture data stored in the text-picture memory unit 11. As shown in the figure, the color picture data stored in the text-picture memory unit 11 is expressed as digital color picture data 22 having 256 tones of the three primary colors: R (red), G (green) and B (blue). A picture element of the digital color picture data 22 of a text manuscript 21 read in by the image scanner corresponds to a 0.0625 mm square on an A4-size sheet of paper. That is to say, there are 16×16 picture elements per 1 $mm^2$ to give a resolution of about 400 dpi. Data of a picture element is represented by 24 bits or data of three consecutive bytes. The first 8 bits of the 24 bits are 256-tone data of the R (red) color. The middle 8 bits of the 24 bits are 256-tone data of the G (green) color and the last 8 bits of the 24 bits are 256-tone data of the B (blue) color. The 8 bits with all set to "1" indicate the white color while the 8 bits all reset to "0" indicate the black color.

Digital color picture data 22 obtained from one scan operation corresponds to a manuscript written on an A4-size sheet of paper and is represented by data of (3,360×4,752) consecutive picture elements. The order of pieces of picture-element data is fixed univocally when they are read from a position on the manuscript of the picture-element data. To put it in detail, the order in which pieces of picture-element data are stored in the text-picture memory unit is the same as the read-in order, that is, a movement order of the optical scanning or the movement of a CCD line image sensor along the short-side (horizontal or left-to-right) direction and the movement of the CCD line image sensor from a scan line to another in the long-side (vertical or top-down) direction. Let an A4-size sheet of paper be placed in a portrait posture. In this case, the data of the first 3,360 picture elements starts with the head picture element at the left end of the uppermost line of the manuscript and continues with subsequent picture elements arranged on the line in the left-to-right order. The data of 3,360 picture elements is treated as a set. The A4-size page of the manuscript contains 4,752 sets which are arranged in the top-down order starting with the uppermost line of the page.

Figure 3:
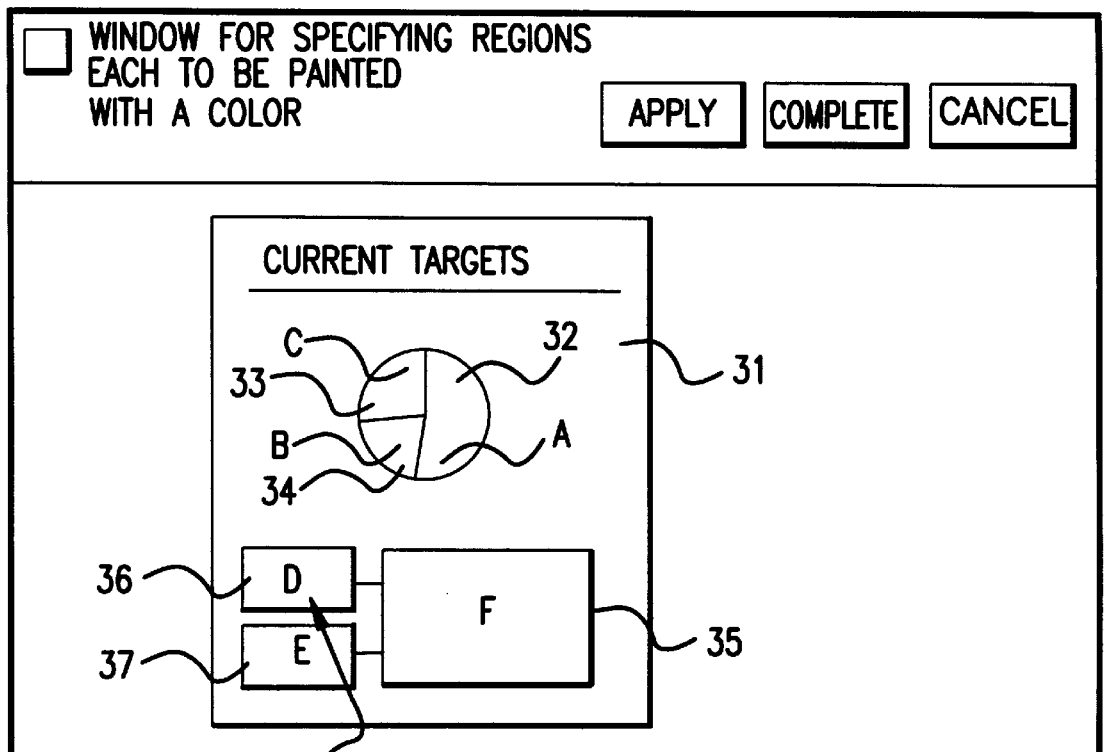
FIG. 3 shows an example of a window for specifying regions each to be painted with a color to an edit-region-request receiving unit 6.

For example, when it is desired to paint a region of a text picture in the manuscript read in this way with a color, a text picture to be edited is displayed on a window for specifying regions each to be painted with a color shown in FIG. 3. The user then makes a request to paint regions with colors by means of a pointing device. The edit-region-request receiving unit 6 carries out processing to receive the coloring request made by the user.

The edit-region-request receiving unit 6 is a system element which receives a request to paint a region on the manuscript with a color from the user (that is, the composer of the text). An example of a window 30 for specifying regions each to be painted with a color to the edit-region-request receiving unit 6 is shown in FIG. 3. When the user specifies a region to be painted with a color in the manuscript, the window 30 for specifying a region to be painted with a color is displayed on the screen. A scanned picture 31 is displayed on the window 30. Then, regions 32 to 37 to undergo coloring/editing are specified by a pointing cursor 38 which is moved by operating a mouse. To put it in detail, the edit-region-request receiving unit 6 displays the scanned picture 31 stored temporarily in the text-picture memory unit 11 on the window 30 for specifying regions each to be painted with a color and the user moves the pointing cursor 38 on the screen to the regions 32 to 37 of the scanned picture 31 by operating a pointing device such as a mouse or a touch pen. The user can make a request to select one region or a plurality of regions from the regions 32 to 37 to be edited.

The edit-region extracting unit 2 carries out processing to extract a closed region (that is, a region to be painted with a color) including a point specified by the user in an edit region specified by the edit-region-request receiving unit 6 as described above. In the processing to extract an edit region, first of all, the values of the 256 tones for the R (red), G (green) and B (blue) of the picture-element data at a point higher than the specified point of the edit object by one picture element in the digital color picture-element data 22 stored in the text picture-element memory unit 11 are examined. The values of the 256 tones for the R (red), G (green) and B (blue) of the picture-element data are referred to hereafter as RGB values. If the data represents a picture element close to the black color, that is, if the sum of the RGB values is equal to or smaller than typically 30, the address of the picture element is stored.

If the examined picture element is not close to the black color, on the other hand, the RGB values of the next upper picture element are examined. The examination of the RGB values of upper picture elements is continued one picture element after another till a black color is found. If a picture element of the black color is found, a picture element of the black color adjacent to the found picture element is next sought. In this way, all picture elements of the black color connected to each other to enclose the closed region including the specified point are identified. In this process, the end point of picture-element data (that is, the end of the text) is treated like a picture element of the black color. The picture elements of the black color enclosing the closed region including the specified point are traced, returning to the first picture element of the black color, the address of which first picture element was stored. In this way, a line enclosing the specified point to be edited (that is, the enclosed region) is extracted. If the tracing of picture elements of the black color does not return to the first picture element, the RGB data of upper picture elements is examined, starting with the first picture element of the black color, the address of which picture element was stored. The same work is repeated till a closed region including the specified point is found.

Figure 4:
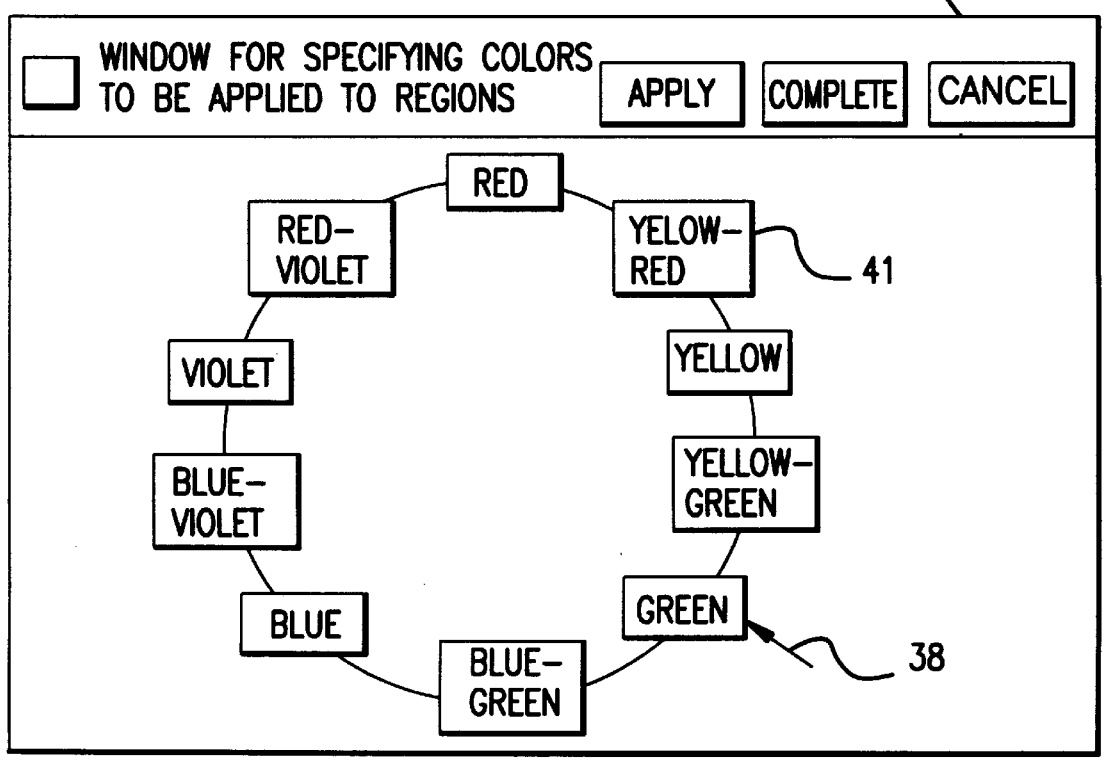
FIG. 4 shows an example of a window for specifying region colors to the region-color-request receiving unit 7.

The region-color-request receiving unit 7 carries out processing to receive a request for a color to be used in the coloring of the extracted region to undergo editing. An example of a window 40 for specifying region colors to the region-color-request receiving unit 7 is shown in FIG. 4. When regions on a manuscript specified by the user are each to be painted with a color, colors which can be specified are displayed on a screen which displays the window 40 for specifying region colors. A color is specified by selecting one color palette 41 displayed on the window 40. In this way, hues are displayed to the user through the window 40 for specifying region colors. A request for a hue of the color to be applied to a region made by the user is then received. As shown in the figure, color palettes 41 each marked with the name of the color thereof are displayed in the color-phase order on the circumference of a circle displayed on the window 40 for specifying region colors. The user selects one of the color palettes 41. Typically, an extended function for a point between any two adjacent color palettes 41 is implemented as follows. When a point between two adjacent color palettes 41 is pointed to by the pointer cursor 38, a color between two colors of the two adjacent color palettes 41 is specified.

After an edit region is extracted and a color for the extracted region is specified, the region-color determining unit 3 determines the density, the chroma and the hue in accordance with the area of the region to be painted with the specified color by abiding by color-arrangement rules. Then, the output-picture generating unit 4 generates a high-quality colored picture. The region-color determining unit 3 comprises the color-arrangement-rule holding unit 12 and the region-area determining unit 13 for carrying out this processing. First of all, the color-arrangement-rule holding unit 12 is explained.

Figure 5:
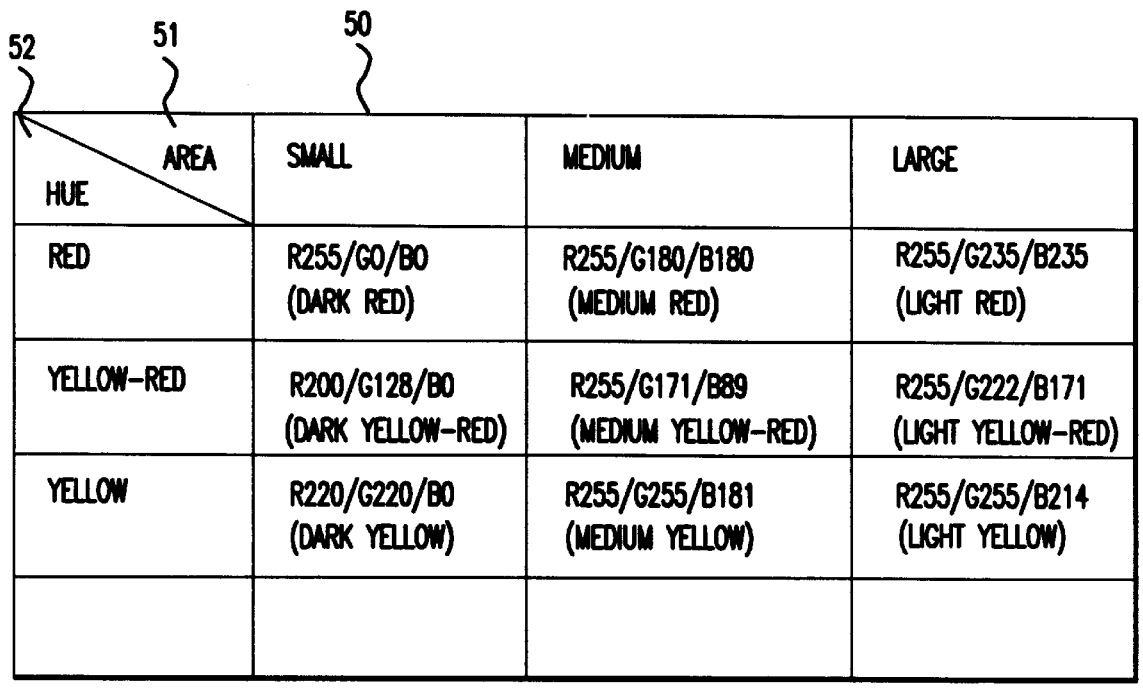
FIG. 5 is a diagram used for explaining typical color-arrangement rules stored in a color-arrangement-rule holding unit 12.

FIG. 5 is a diagram used for explaining typical color-arrangement rules stored in the color-arrangement-rule holding unit 12. The color-arrangement rules 50 prescribe region areas 51 and RGB values of a specified region color representing a color to be selected in accordance with a hue 52 of the specified region color. That is to say, the figure shows a look-up table for obtaining RGB values of an actual color arrangement for the region by using two parameters: the area 51 of the region to be painted with a color and the hue 52 of the color used in the coloring. The color-arrangement rules shown in the look-up table express or define knowledge for determining what density, chroma and hue to be used in accordance with the area of a region. The color-arrangement rules are stored in advance typically in a ROM (Read-Only Memory) unit. As shown in the figure, values of three tones for the RGB values of a region color are determined in accordance with the specified hue and the areas of specified regions. High and low-density colors are assigned to regions with small and large areas respectively. Default values prepared in advance or threshold values set by the user serve as criteria used for determining whether the area of a region is small, medium or large.

Figure 6:
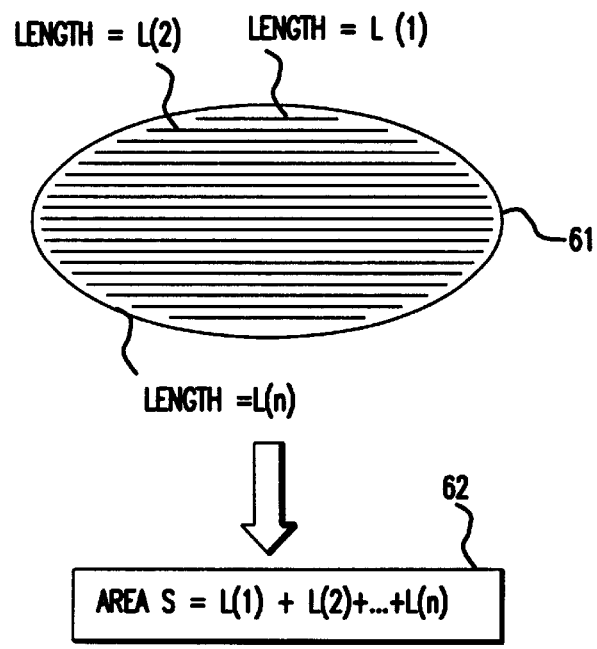
FIG. 6 is a diagram used for explaining processing carried out by a region-area determining unit 13 to calculate the area of a region.

Next, operations carried out by the region-area determining unit 13 are explained. The region-area determining unit 13 computes the area of an extracted region to be edited, that is, an extracted region to be painted with a color by counting the number of picture elements included in the region. FIG. 6 is a diagram used for explaining processing carried out by the region-area determining unit 13 to calculate the area of a region. As shown in the figure, in the processing to calculate the area of a region, the number of picture elements in the closed region 61 extracted by the edit-region extracting unit 2 is counted as follows. First of all, the number of picture elements in a scan line (Li) is counted in the main scanning (horizontal or short-side) direction. The counting is repeated for all the scan lines Li, where i=1 to n, in the auxiliary scanning (vertical or long-side) direction in the closed region 61 in order to find the total number of picture elements 62 which total number represents the area of the closed region 61.

The area of a region to be painted with a color found by the region-area determining unit 13 employed in the region-color determining unit 3 is used to determine the region color for the region in accordance with the color-arrangement rules stored in the color-arrangement-rule holding unit 12. To put it in detail, the color-arrangement rules are referenced for determining actual RGB values in accordance with the area of the region to be painted with a color and a specified hue. In this way, the area of a region computed by the region-color determining unit 13 is used for determining the density and the chroma of the color for the region or actual values for the hue in accordance with the color-arrangement rules.

When the color-arrangement rules are used for determining RGB values as described above, a judgment is made to determine whether the area of a region is small, medium or large by setting threshold values in terms of percents defining the ranges of the area which is occupied by the region as compared with the entire page or, in other words, defining the ranges of the picture-element count in the area as compared with a total picture-element count of 3,360×4,752. The threshold values are used as criteria in the determination of the RGB values. For, example the ranges up to 5%, 5 to 20% and greater than 20% correspond to small, medium and large areas respectively. These ranges can be used as default ranges. As an alternative, the user can set the values limiting the ranges in advance. Given the ranges described above and a picture-element count of about 1,600,000 in the entire page, the size of an area is determined by using the number of picture elements Nr in the area as follows:

$$Nr < 800,000,$$

the area is determined to be small, $$800,000 \leq Nr < 3,200,000,$$

the area is determined to be medium, $$3,200,000 \leq Nr,$$

the area is determined to be large.

Then, the specified color can change from a dark to a light one used in the actual coloring, depending upon the range indicated by the parameter "small," "medium" or "large" indicating the relative size of the area.

For a region specified in the processing carried out by the region-color determining unit 3 as described above, colored-picture data is generated by the output-picture generating unit 4 as a digital picture which can be printed out. To be more specific, the output-picture generating unit 4 receives text-picture data temporarily stored in the text-picture memory unit 11 of the manuscript-picture holding unit 1, data of regions each to be painted with a color from the edit-region extracting unit 2 and data of region colors from the region-color determining unit 3 and synthesizes a colored text picture from these pieces of information in order to generate data of an output picture. At that time, a processed picture expressed in terms of RGB values according to the color-arrangement rules is converted into printable color data in a color space such as CMYK values corresponding to the toner of a color copy machine. It should be noted that portions of the picture other than the colored regions are output by reproducing the input manuscript with a high degree of fidelity in accordance with the printing performance.

The print-out unit 5 which includes the output-picture memory unit 15 actually carries out processing to print out the text picture on a sheet of recording paper. To put it in detail, the print-out unit 5 receives the data of an output picture from the output-picture generating unit 4 and temporarily stores the data into the output-picture memory unit 15. The data of the output picture is transcribed and output to the paper by means of laser-beam print mechanisms. In the case of the copy machine implemented by this embodiment, the picture is output at full colors. For this reason, information on tone values of the cyan, magenta, yellow and black colors for each picture element is temporarily stored in the output-picture memory unit 15 to be transmitted later to each of the print mechanisms. In addition, besides the laser-beam printer which is capable of printing data in full colors, the picture can also be printed out by utilizing a marking technology such as the ordinary paper thermal transcription.

Figure 7:
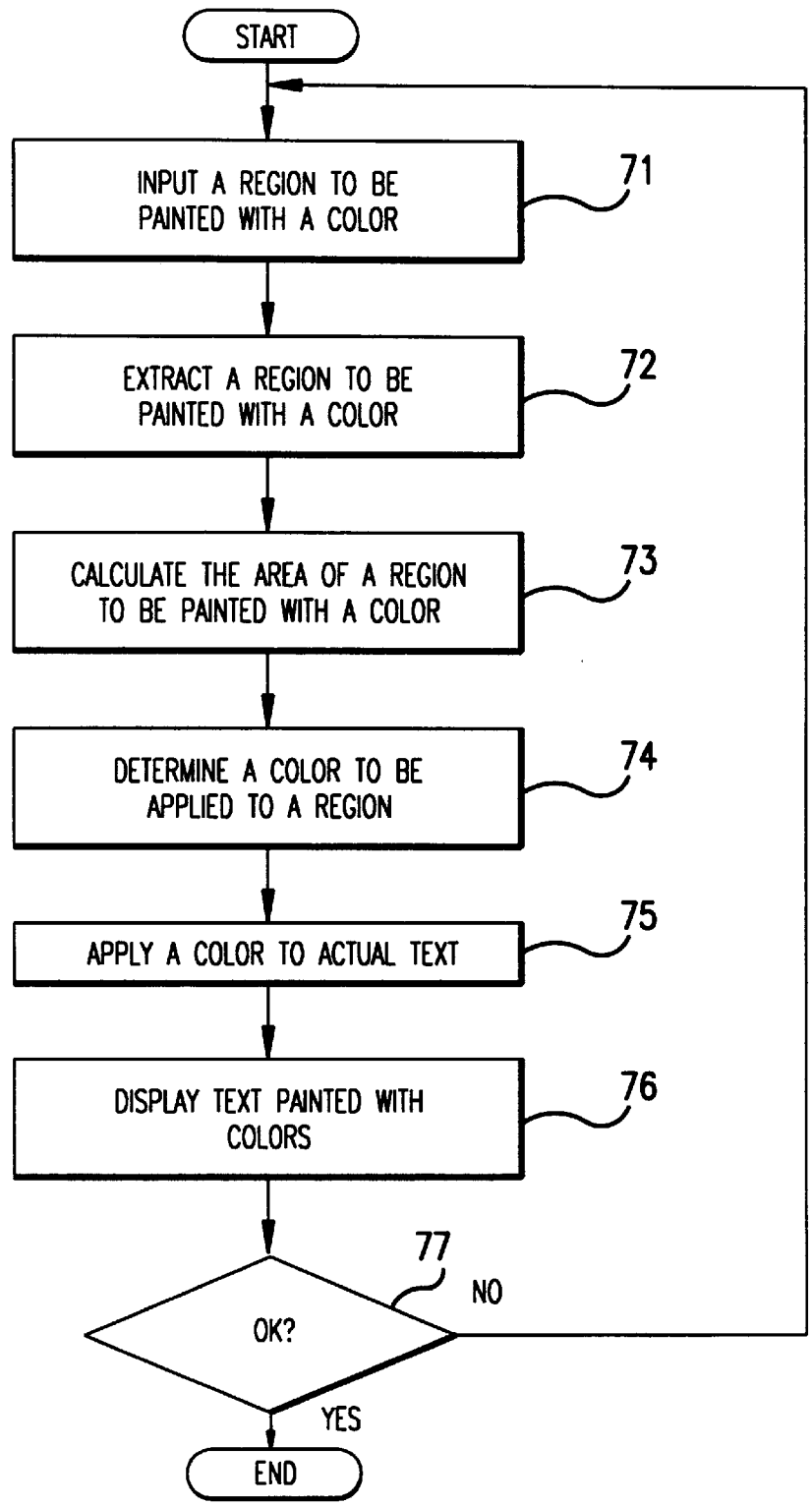
FIG. 7 is a flowchart showing a processing flow of a process to paint a region with a color carried out by a control unit of the graphic processing apparatus implemented by the 1st embodiment in accordance with the present invention.

FIG. 7 is a flowchart showing a processing flow of a process to paint a region with a color carried out by a control unit of the graphic processing apparatus implemented by the 1st embodiment in accordance with the present invention. In the block diagram of the system configuration shown in FIG. 1 described earlier, the control unit of the graphic processing apparatus is not shown. None the less, the control units controls the system components shown in the figure to carry out a coloring process on a text picture in accordance with a processing flow shown in FIG. 7.

The processing to paint a region with a color carried out by the control unit of the graphic processing apparatus implemented by the 1st embodiment is explained by referring to the flowchart shown in FIG. 7. First of all, the processing starts with a step 71 at which processing to input locations indicating regions each to be painted with a color is carried out. At this step, in the first place, a scanner is controlled to let the scanner read in a text picture and temporarily store it into the text-picture memory unit 11 of the manuscript-picture holding unit 1. Then, the edit-region-request receiving unit 6 is controlled to display the picture data stored in the text-picture memory unit 11 on a window 30 for specifying regions each to be painted with a color as shown in FIG. 3. A command specifying regions each to be painted with a color of the picture is received. Subsequently, a window 40 for specifying region colors shown in FIG. 4 is displayed.

In this case, the request received by the edit-region-request receiving unit 6 to specify regions each to be painted with a color is made by the user by means of a pointing device such as a mouse which is used for pointing to each of the regions to be painted with a color. For example, in the window 30 for specifying regions to be painted with a color as shown in FIG. 3, a region D is selected by having the pointing cursor 38 point to the region D. Subsequently, the color palette of the green color in the window 40 for specifying region colors shown in FIG. 4 is specified by using the pointing cursor 38 in the same way as the selection of the region D. By doing so, the green color is specified for the selected region D in the text picture 31. Likewise, other regions can be selected and colors can be specified for the other selected regions. In this example, the red and blue colors are specified for the selected regions A and B respectively whereas the green color is specified the for selected regions C and D and another selected region E. As for a selected region F, the blue color is specified.

After the processing carried out at the step 71 to input locations representing regions each to be painted with a color, wherein regions to be edited are selected and colors for the regions are specified, is completed, the processing flow then continues to a step 72 to carry out processing to extract each of the regions to be painted with a color. To put it in detail, when the request to paint each of the regions with a color is received, the edit-region extracting unit 2 extracts the regions to be edited. In the processing to extract a region, a closed region enclosing a point specified as an object to be painted with a color is extracted. A closed region is extracted by examining the RGB values of a point higher than the specified point of the edit object by one picture element. If the RGB values represent a picture element close to the black color, the address of the picture element is stored. If the examined picture element is not close to the black color, on the other hand, the RGB values of the next upper picture element are examined. The examination of the RGB values of upper picture elements is continued one picture element after another till a black color is found. If a picture element of the black color is found, a picture element of the black color adjacent to the found picture element is next sought. In this way, all picture elements of the black color connected to each other to enclose the closed region including the specified point are identified. The picture elements of the black color enclosing the closed region including the specified point are traced, returning to the first picture element of the black color, the address of which picture element was stored. In addition, when a color in the text is specified as a region color, a closed region including a location pointed to for specifying the color is searched for a picture element, all the bits of which are neither zeros nor ones. The color of this picture element is then taken as the specified color. It should be noted that the RGB values are represented by 24-bit data.

The processing flow then proceeds to a step 73 to carry out processing to compute the area of a region. As shown in FIG. 6, in the processing to calculate the area of a region, the number of picture elements included in a closed region extracted in a process to extract an edit region is counted as follows. First of all, the number of picture elements in a scan line (Li) is counted in the main scanning (horizontal or short-side) direction. The counting is repeated for all the scan lines Li, where i=1 to n, in the auxiliary scanning (vertical or long-side) direction in the closed region in order to find the total number of picture elements which total number represents the area of the closed region. As a result, the areas of the regions each to be painted with a color, that is, the numbers of picture elements in the regions are found for example as follows: 1,200,000 in the region A, 300,000 in the region B, 850,000 in the region C, 1,000,000 in the region D, 1,000,000 in the region E and 4,000,000 in another selected region F.

The processing flow then continues to a step 74 to carry out processing to determine a color for each of the regions A to F. The area of each of the regions A to F is judged to be small, medium or large by comparing the number of picture elements in the region with reference values described earlier. That is to say, a picture-element count of 800,000 is used as the threshold value between small and medium areas whereas a picture-element count of 3,200,000 is used as the threshold value between medium and large areas. The color-arrangement rules are then used to determine the coloring of each of the regions A to F in accordance with the result of the judgment. To be more specific, the judgment to determine whether the area of a region is small, medium or large is based on the number of picture elements in the region as follows:

Region A: The number of picture elements is 1,200,000, putting the area thereof in the medium range.

Region B: The number of picture elements is 300,000, putting the area thereof in the small range.

Region C: The number of picture elements is 850,000, putting the area thereof in the medium range.

Region D: The number of picture elements is 1,000,000, putting the area thereof in the medium range.

Region E: The number of picture elements is 1,000,000, putting the area thereof in the medium range.

Region F: The number of picture elements is 4,000,000, putting the area thereof in the large range.

The above judgment results regarding the areas and information on colors for the selected regions given by the user are used to determine regions colors in accordance with the color-arrangement rules as follows:

Region A=Medium red

Region B=Dark blue

Region C=Medium green

Region D=Medium green

Region E=Medium green

Region F=Light blue

The processing flow then continues to a step 75 to carry out processing to add region colors determined at the step 74 to the actual text. Subsequently, the processing flow continues to a step 76 to display the text to which the colors have been applied. Then, the processing flow proceeds to a step 77 to display an inquiry to the user, asking the user whether or not the results of coloring the regions are good. A response to the inquiry received from the user is then evaluated. If the response received from the user confirms that the results of the region coloring are good, the processing is completed. If the user is not satisfied with the processing results, on the other hand, the processing flow returns to the step 71 to repeat the processings from the step 71.

That is to say, the region colors determined by the processings carried out so far are applied to the text picture by controlling the output-picture generating unit 4 and resulting text-picture data is temporarily stored in the output-picture memory unit 15 employed in the print-out unit 5 to be output later by the print-out unit 5. In this case, the resulting text-picture data stored in the output-picture memory unit 15 is displayed on the screen of a display unit to be previewed by the composer. If the composer is not satisfied with the results, the processings are carried out once more.

Next, modified versions of system components composing the graphic processing apparatus implemented by the 1st embodiment having a configuration described above are explained. As shown in FIG. 3, the edit-region-request receiving unit 6 of the 1st embodiment displays a window 30 for specifying regions each to be painted with a color on the screen including a scanned picture 31 and the regions 32 to 37 pointed to by the pointing cursor 38, which is driven by a mouse, are selected as regions to undergo color editing as described earlier. In this case, a command inputting unit such as an editor pad for specifying regions each to be painted with a color can be used. As an alternative, it is also possible to use a command inputting unit that is capable of recognizing an enclosed region including a position on a manuscript marked by a marker pen with a specific color.

In another version of the edit-region-request receiving unit 6, one of the system components composing the graphic processing apparatus, a closed region including a picture element with a color other than black and white is recognized among data stored in a picture memory unit for storing a manuscript composed of colored text. In this case, the closed region is identified as a region to be painted with a color and the color of a picture element included in the closed region is taken as a region color. To put it in concrete terms, a text picture is searched for a picture element, the bits of which are neither all zeros nor all ones. The color of the picture element is used as a specified region color and the coordinates of the picture element are used as coordinates of a specified point.

As described above, in the case of a manuscript composed of colored text, a color in a closed region of a region specified and extracted as an editing object is used as the color of the specified region. The processing can then be carried forward without specially specifying a region color by means of the color-region-request receiving means 7. In the case of a closed region to be edited including a plurality of colors, the color of majority picture elements constituting the closed region is used as the region color or, as an alternative, a request made by the user to select a region color is received instead.

In the color-arrangement rules stored in the color-arrangement-rule holding unit 12 of the 1st embodiment described above, the area and density segments can each be further divided into smaller subsegments and their relations can be prescribed in more detail. In addition, the color specifications of region colors defined by the relation between the area and density can be expressed in terms of YMCK values or coordinates in a color space system such as the Munsell color system. In addition, the hue can also be classified further into detailed categories.

In addition, the color-arrangement rules stored in the color-arrangement-rule holding unit 12 can also be expressed in terms of relations between the area and the chroma. For example, color-arrangement rules are set so that, being striking, a high chroma is applied to a small area while a non-striking low chroma is suitable for a large area. In this way, unbalanced highlighting states caused by differences in area among regions of a manuscript picture can be avoided.

In addition, the color-arrangement rules stored in the color-arrangement-rule holding unit 12 can also be expressed in terms of relations between the area and the hue. For example, color-arrangement rules are set so that, a hue close to the red color which is striking as well as vivid is used for a region with a small area while a hue close to the blue color which is neither striking nor vivid is applied to a region with a large area. In this way, unbalanced highlighting states caused by differences in area among regions of a manuscript picture can be avoided.

In addition, the color-arrangement rules stored in the color-arrangement-rule holding unit 12 can also be expressed in terms of combinations of relations between the area and the density, chroma and hue in order to very effectively avoid unbalanced highlighting states caused by differences in area among regions of a manuscript picture. For example, by combining the chroma with the density, the highlighting states can be controlled more finely. Differences in density on a document that can be recognized by ease are classified into about four stages at the most. By combining the chroma with the hue, however, more grades can be used for expressing highlighting states.

Figure 8:
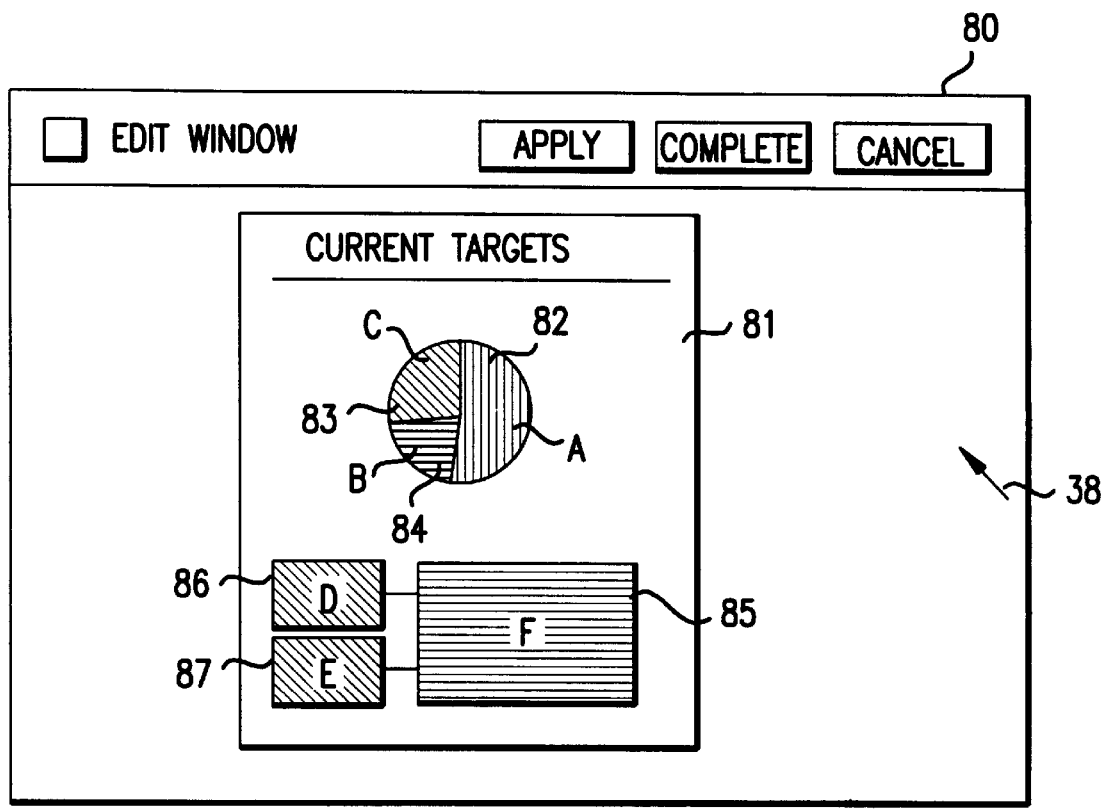
FIG. 8 is a diagram used for explaining the coloring of regions of a text picture wherein the densities of colors assigned to regions of the text are determined in accordance with the areas of the regions.

FIG. 8 is a diagram used for explaining the coloring of regions of a text picture wherein the densities of colors assigned to regions of the text are determined in accordance with the areas of the regions. In this case, first of all, processing to calculate the area of each region to be painted with a color or a region serving as an object to undergo color editing is carried out as has been described earlier. Let the picture-element count in the regions each to be painted with a color be found to be 1,200,000 for the region A, 300,000 for the region B, 850,000 for the region C, 1,000,000 for the region D, 1,000,000 for the region E and 4,000,000 for the region F. Subsequently, the number of element pictures in each of the regions is compared with the typical threshold values 800,000 and 3,200,000. If the number of element pictures in a region is found smaller than 800,000, the region is judged to be small. If the number of element pictures in a region is found greater than 800,000 but smaller than 3,200,000, on the other hand, the region is judged to be medium. If the number of element pictures in a region is found greater than 3,200,000, the region is judged to be large. Then, the color-arrangement rules are applied in accordance with the results of the judgment and colors specified for the regions in order to determine the coloring of each of the regions.

The results of the judgment determine region colors as follows:

Region A: The number of picture elements is 1,200,000, putting the area thereof in the medium range and assigning a medium red color.

Region B: The number of picture elements is 300,000, putting the area thereof in the small range and assigning a dark blue color.

Region C: The number of picture elements is 850,000, putting the area thereof in the medium range and assigning a medium green color.

Region D: The number of picture elements is 1,000,000, putting the area thereof in the medium range and assigning a medium green.

Region E: The number of picture elements is 1,000,000, putting the area thereof in the medium range and assigning a medium green color.

Region F: The number of picture elements is 4,000,000, putting the area thereof in the large range and assigning a light blue color.

The above coloring states are displayed on an edit window 80 for previewing a text picture 81 as shown in FIG. 8. As shown in the figure, regions of the text picture are each painted with a color as follows:

A region 82 is painted with a medium red color; a region 83 is painted with a medium green color; a region 84 is painted with a dark blue color; a region 85 is painted with a light blue color; and regions 86 and 87 are painted with a medium green color.

As is obvious from the above coloring example, for a variety of regions in a text picture, the smaller the region, the darker the color assigned to the region or, in other words, the larger the region, the lighter the color assigned to the region.

Figure 9:
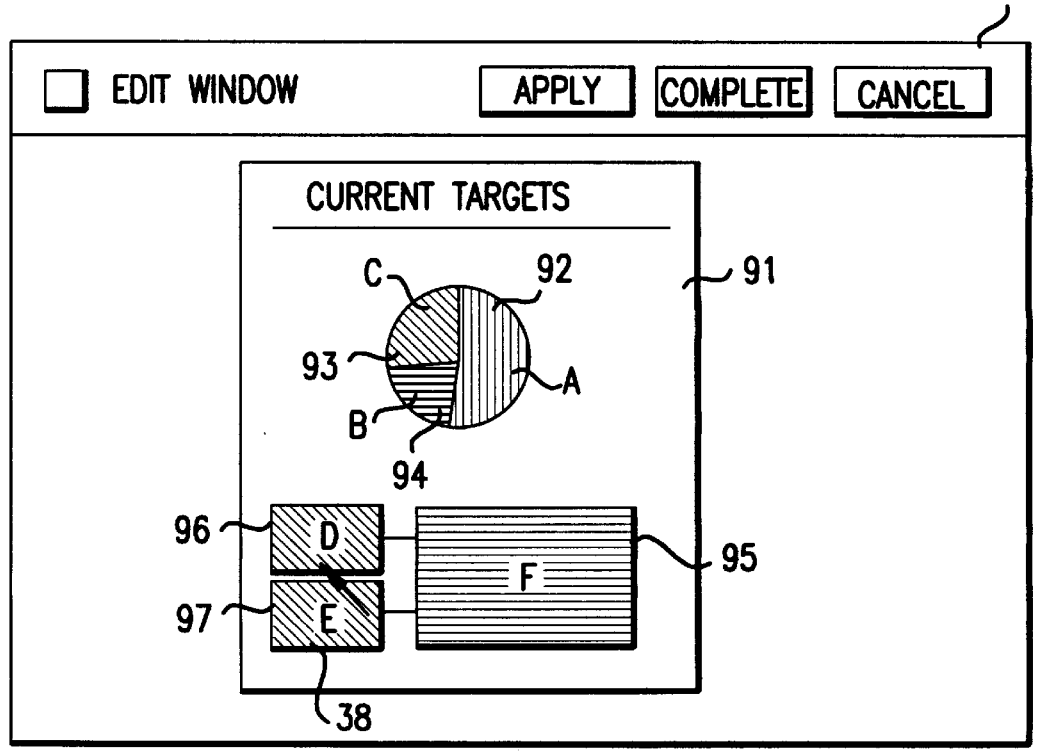
FIG. 9 is a diagram used for explaining the coloring of regions of a text picture wherein the densities and the chromas of colors assigned to regions of the text are determined in accordance with the areas of the regions.

A color is painted in a way of coloring which can be changed by modifying the color-arrangement rules stored in the color-arrangement-rule holding unit 12. FIG. 9 is a diagram used for explaining the coloring of regions of a text picture wherein the densities and the chromas of colors assigned to regions of the text are determined in accordance with the areas of the regions. In this case, the color-arrangement rules stored in the color-arrangement-rule holding unit 12 prescribe a combination or relations between the area and the density, chroma and hue. With such color-arrangement rules, a text picture in which variances in highlighting states caused by differences in area among the regions thereof are very effectively eliminated as shown in FIG. 9 is obtained. To be more specific, in the edit window 90 shown in the figure for previewing a text picture, regions in the text picture 91 are each painted with a color as follows: a region 92 is painted with a red color having a low chroma and a medium density; a region 93 is painted with a green color having a medium chroma and a medium density; a region 94 is painted with a blue color having a high chroma and a high density; a region 95 is painted with a blue color having a low chroma and a low density; a region 96 is painted with a green color having a high chroma and a medium density; and a region 97 is painted with a green color having a high chroma and a medium density.

By comparing the example shown FIG. 9 with the example shown in FIG. 8, it becomes obvious that the region 83 (or the region C), the region 86 (or the region D) and the region 87 (or the region E) shown in FIG. 8 are assigned the same color and not differentiated from each other while the region 93 (or the region C), the region 96 (or the region D) and the region 97 (or the region E) shown in FIG. 9 are assigned colors having attributes different from each other.

In this way, a combination of a chroma and a density is determined for each region in a text picture in accordance with the area of the region. The smaller the area of a region, the higher the chroma and the higher the density of the color used for painting the region. In other words, the larger the area of a region, the lower the chroma and the lower the density of the color used for painting the region. As a result, the state of highlighting can be controlled more finely. Differences in density on a document that can be recognized by ease are classified into about four stages at the most. By combining the chroma with the hue, however, more grades can be used for expressing highlighting states more finely.

[Second Embodiment]

Next, a 2nd embodiment implementing a graphic processing apparatus in a workstation is explained. The graphic processing apparatus implemented by the 1st embodiment described above handles only scan-in (raster) pictures. On the other hand, the 2nd embodiment is an example of implementation of a graphic processing apparatus that is capable of handling code information in addition to raster pictures.

Being the same as the configuration of the 1st embodiment, no diagram showing the configuration of the 2nd embodiment is given. Only differences in system components composing the configuration between the 1st and 2nd embodiments are explained. Here, for the sake of convenience, the explanation is given by referring to FIG. 1.

A system component that corresponds to the manuscript-picture holding unit 1 employed in the 1st embodiment is implemented in the 2nd embodiment by a working memory of a WYSIWYG (What You See Is What You Get) editor. Having a graphical user interface function, the WYSIWYG editor can draws pictures. The working memory is used for storing code information for constructing a text picture. It is also necessary to allocate a text-picture memory area for laying out a text picture based on the code information in the working memory. The text-picture memory area corresponds to the text-picture memory unit 15 employed in the 1st embodiment.

A system component that corresponds to the edit-region-request receiving unit 6 employed in the 1st embodiment is implemented in the 2nd embodiment by a graphical user interface screen for specifying and selecting regions on a text picture each to be painted with a color by the WYSIWYG editor. Such regions are specified and selected by means of a pointing device such as a mouse pointing thereto. The graphical user interface screen is similar to the window 30 of the 1st embodiment for specifying regions each to be painted with a color shown in FIG. 3. This system component may comprise, among other things, a subsystem component for taking a closed region including color information as a specified region, a subsystem component for requesting a region by using text information included in a closed region and a subsystem component for taking a region matching a text stored in a data base as a specified region.

A system component that corresponds to the edit-region extracting unit 2 employed in the 1st embodiment is implemented in the 2nd embodiment by a processing module for loading a closed region (that is, a region based on code information) specified and selected by using the graphical user interface screen corresponding to the edit-region-request receiving unit 6 into a working memory other than the text-picture memory area. In addition, a system component that corresponds to the region-area determining unit 13 is a processing module for counting the number of picture elements included in a region specified and selected by using the graphical user interface screen corresponding to the edit-region-request receiving unit 6. The region is loaded into a working memory other than the text-picture memory area and then displayed on the screen in order to calculate the area of the region. Processes carried out in accordance with a processing procedure are the same as the processes of the copy machine implemented by the 1st embodiment.

The other system components are the same as those employed in the 1st embodiment. To be more specific, the region-color-request receiving unit 7, the color-arrangement-rule holding unit 12, the region-color determining unit 3, the output-picture generating unit 4 and the print-out unit 5 are the same as those employed in the 1st embodiment.

Next, operations of the graphic processing apparatus comprising the system components described above as implemented by the 2nd embodiment are explained. Since most of the system components are the same as those employed in the 1st embodiment, the operation flow is also the same as the processing flow of the 1st embodiment explained by referring to FIG. 7. For this reason, the operations of the graphic processing apparatus implemented by the 2nd embodiment can be explained just briefly.

The operation procedure of the graphic processing apparatus implemented by the 2nd embodiment is the same as the processing flow of the 1st embodiment shown in FIG. 7. First of all, a text manuscript to be processed is read in and temporarily stored in the manuscript-picture holding unit 1. A picture of the text manuscript to be processed is read in from a main memory unit by the WYSIWYG editor and temporarily stored in a picture memory unit. As an alternative, a picture is drawn by the composer directly on the picture memory unit by using editor functions and temporarily stored therein.

Next, regions each to be painted with a color are selected through the window 30 for specifying each of the regions to be painted with a color by operating a pointing device such as a mouse as shown in FIG. 3. A closed region is then extracted in the same way as the 1st embodiment. In this case, instead of entering a command by operating the pointing device, functions of a key board or a menu displayed on a graphical interface screen can be used. In the case of the menu, by requesting a text [D] from the menu, a region including a text code [D] is specified. The associated processing module actually works as follows. When the user enters the text code [D], the system searches code information for text [D] to find out a location on the text-picture memory area at which location the text [D] is laid out. Then, the coordinates of the location are used to represent a specified point and a closed region is extracted in the same way as the 1st embodiment.

A color can be specified by using the window 40 shown in FIG. 4 for specifying colors or, if information on color exists in a region including the text [D], the color can be regarded as a region color. As an alternative, information stating: "The region including D is assigned the green color," is stored from the beginning in a color specifying data base which is prepared in advance. A region color can then be specified by referencing the color specifying data base.

Processing to calculate the area of a region to be painted with a color is carried out by using the text-picture memory area in the same way as the 1st embodiment. The area of a region and the specified color are then used for determining a region color from a knowledge table prescribing color-arrangement rules as shown in FIG. 5. Then, the determined region colors are used for painting the manuscript picture in the text-picture memory area for preview. If the user enters a print-out command, RGB values of colors displayed on the display screen are converted into CMYK values of color information for printing purposes. Results of the conversion are loaded into the output-picture memory unit to be output to the print-out unit.

[Third Embodiment]

Next, a 3rd embodiment implementing a graphic processing apparatus provided by the present invention is explained. In the 1st embodiment implementing the graphic processing apparatus provided by the invention in a copy machine, the user specifies regions in a text picture each to be painted with a color and colors to be applied to the regions or regions to be painted with the same color. The area of each region to be painted with a color is then calculated and the area is used for determining the density, the chroma and the hue of a color assigned to the region in accordance with the color-arrangement rules. Finally, a high-quality picture is generated and output. Adding categories as important parameters to the color-arrangement rules will result in a scheme that allows the composer (that is, the user) to create a high-quality picture reflecting the intention thereof. Such a configuration is implemented by the 3rd embodiment explained as follows.

In the case of the graphic processing apparatus implemented by the 3rd embodiment, the user can specify regions in a text picture each to be painted with a color and colors to be applied to the regions or regions to be painted with the same color, categories each serving as a set of a plurality of regions to be painted with the same color and the degree of importance of each of the specified regions or categories. The area of each region or category to be painted with a color is then calculated by the system and the area and the degree of importance are used for determining the density, the chroma and the hue of a color assigned to the region or the category in accordance with the color-arrangement rules. Finally, a high-quality picture is generated and output.

Figure 10:
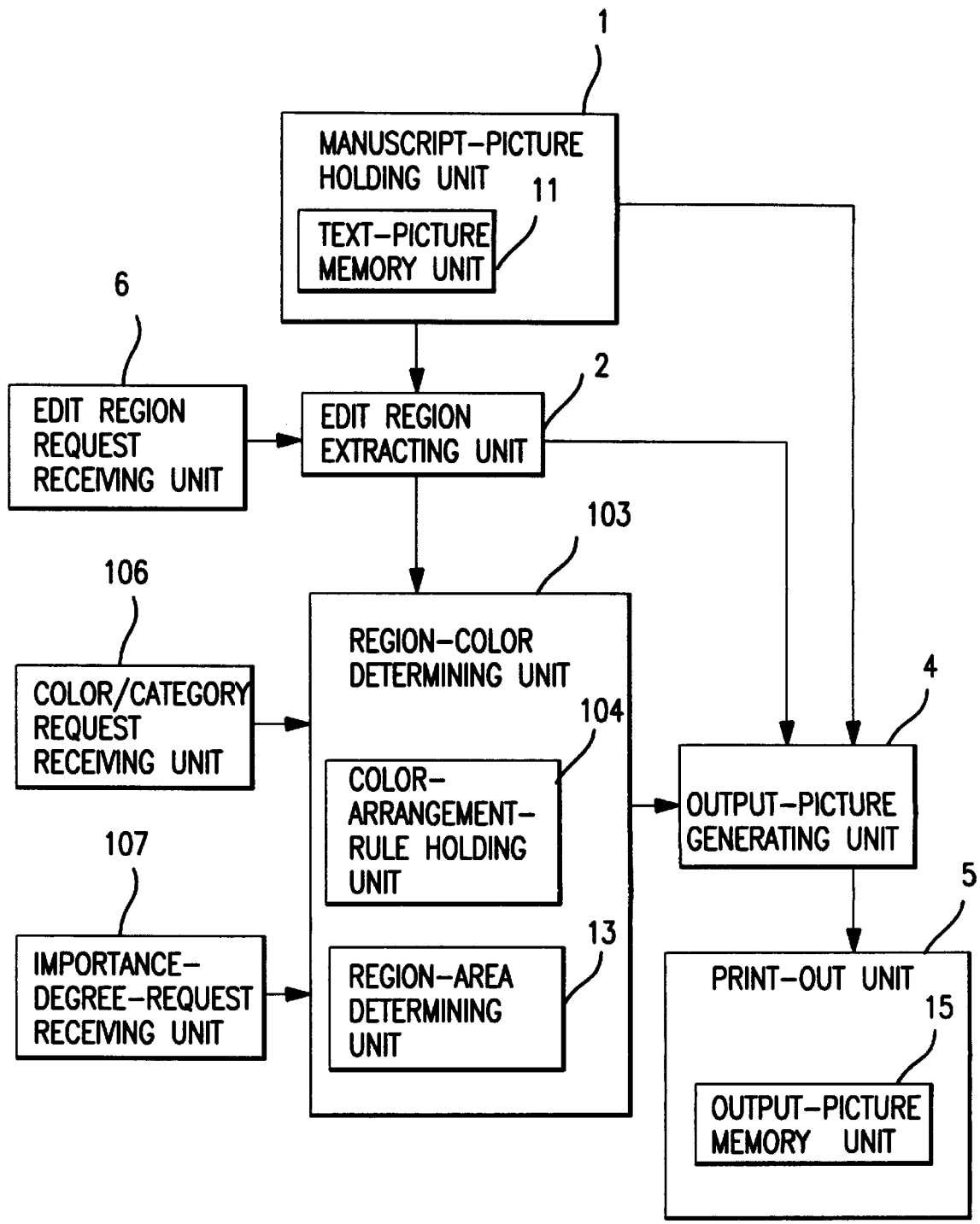
FIG. 10 is a diagram showing an overall system configuration of a graphic processing apparatus as implemented by a 3rd embodiment in accordance with the present invention.

FIG. 10 is a diagram showing an overall system configuration of a graphic processing apparatus implemented by the 3rd embodiment in accordance with the present invention. Reference numeral 1 shown in the figure is a manuscript-picture holding unit whereas reference numeral 2 denotes an edit-region extracting unit. Reference numeral 4 denotes an output-picture generating unit. Reference numeral 5 denotes a print-out unit whereas reference numeral 6 is an edit-region-request receiving unit. Reference numeral 11 denotes a text-picture memory unit whereas reference numeral 13 is a region-area determining unit. Reference numeral 15 denotes an output-picture memory unit. Reference numerals 103 and 104 are a region-color determining unit and a color-arrangement-rule holding unit respectively. Reference numeral 106 denotes a color/category-request receiving unit while reference numeral 107 is an importance-degree-request receiving unit.

In the configuration of the graphic processing apparatus implemented by the 3rd embodiment as shown in FIG. 10, system components identical with those used in the graphic processing apparatus implemented by the 1st embodiment are denoted by the same reference numerals as those used in the 1st embodiment. That is to say, the manuscript-picture holding unit 1, the edit-region extracting unit 2, the output-picture generating unit 4, the print-out unit 5, the edit-region-request receiving unit 6, the text-picture memory unit 11, the region-area determining unit 13 and the output-picture memory unit 15 are the same as those employed in the graphic processing apparatus implemented by the 1st embodiment.

In the configuration of the graphic processing apparatus implemented by the 3rd embodiment, the color/category-request receiving unit 106 and the importance-degree-request receiving unit 107 are system components used as substitutes for the region-color-request receiving unit 7 employed in the 1st embodiment shown in FIG. 1. In conformation with the color/category-request receiving unit 106 and the importance-degree-request receiving unit 107, the color-arrangement-rule holding unit 104 is used for storing color-arrangement rules which includes the following parameters: the color, the category and the degree of importance. In accordance with the color-arrangement rules which include the three parameters, that is, the color, the category and the degree of importance, the region-color determining unit 103 determines a color to be applied to each region depending upon the area of the region.

Next, system components composing the graphic processing apparatus implemented by the 3rd embodiment are explained. The color/category-request receiving unit 106 receives a command from the composer (that is, the user) to indicate the hue of a color to be applied to each region to be painted with a color or a group (or a category) of regions to be painted with the same color. For example, in the case of a text picture having a plurality of regions to be painted with the same color, the regions are treated as a category. Then, such regions in the text picture are collected in the same group and handled as a category corresponding to the group.

Figure 11:
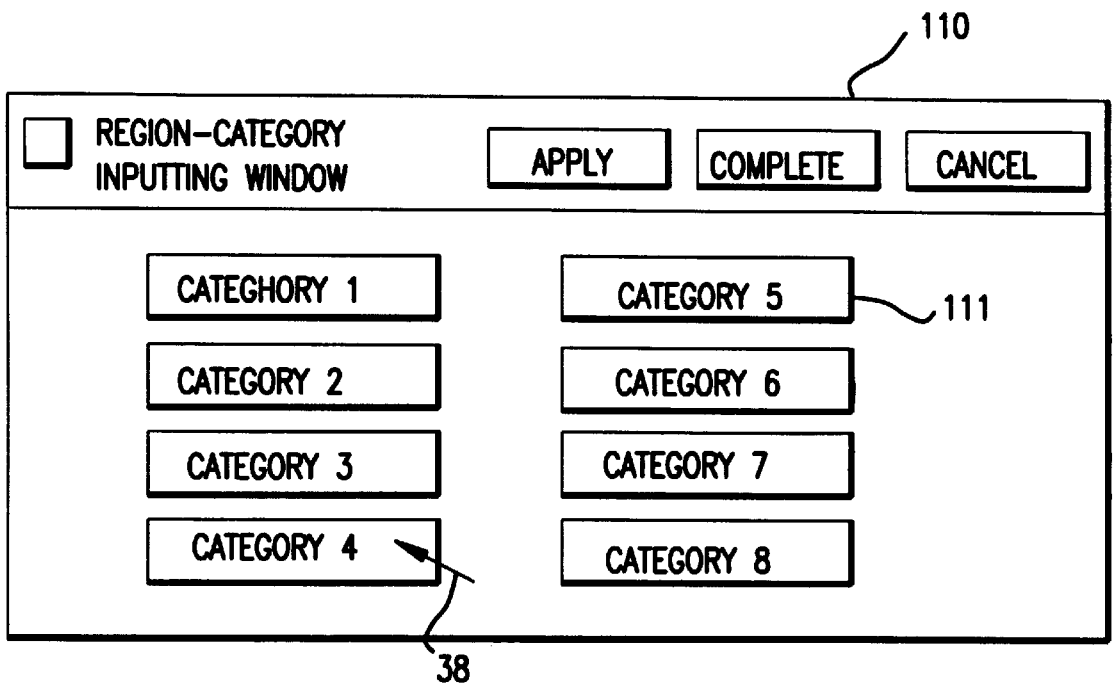
FIG. 11 is a diagram showing an example of a window for entering a region category to a color/category-request receiving unit 106.

FIG. 11 is a diagram showing an example of a window for entering a region category to the color/category-request receiving unit 106. An operation to specify a category for a region is explained by referring to FIG. 11. First of all, regions to be edited are specified through the window 30 shown in FIG. 3 for specifying regions each to be painted with a color. As shown in FIG. 11, a category number is then specified for the regions through a window 110 for inputting region categories. To be more specific, after some regions are specified, a category number 111 is specified through the window 110 for inputting region categories. In this way, the same category number is assigned to a plurality of specified regions. For example, category 1={region a, region b, region c} means that a plurality of regions a, b and c are cataloged in the same category indicated by No. 1.

A color for a category including a plurality of regions is specified in the same way as the 1st embodiment. That is to say, the name of a color is specified for a category as the name of a color to be applied to the region is specified for the region through the window 40 for specifying region colors as shown in FIG. 4. A region color is requested by operating a touch panel or a pointing device such as a mouse so as to have the pointing device point to the color palette of the region color.

Figure 12:
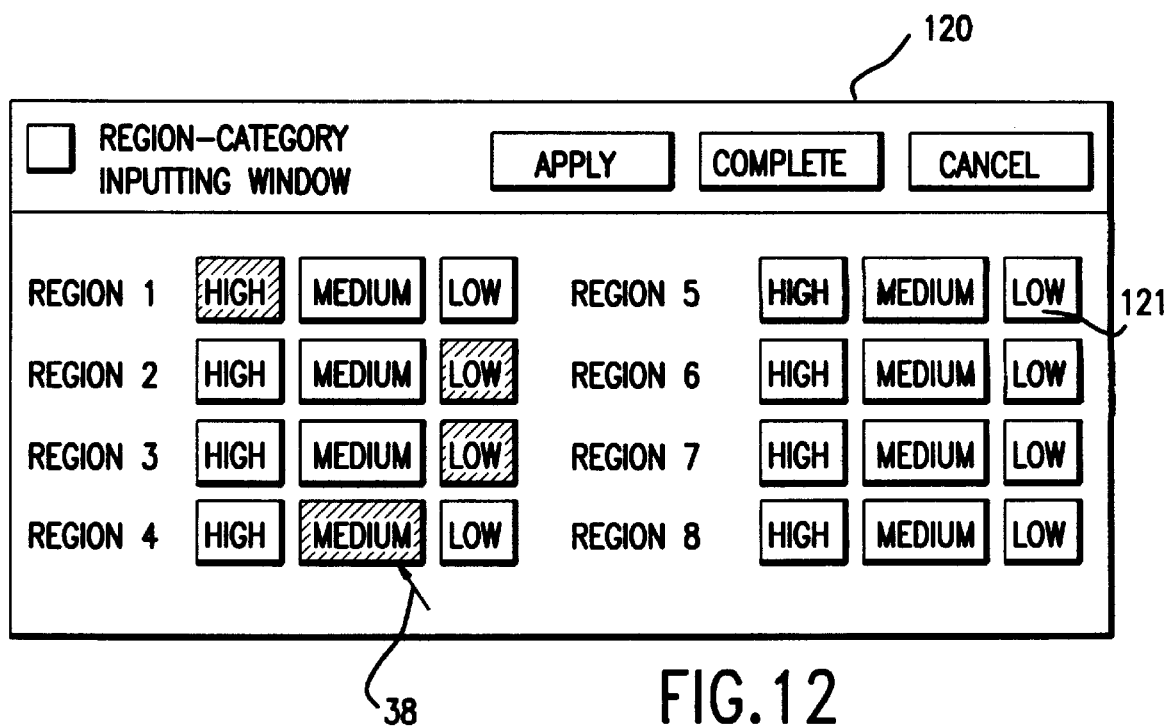
FIG. 12 is a diagram showing an example of a window for inputting the degree of importance to an importance-degree-request receiving unit 107.

FIG. 12 is a diagram showing an example of a window 120 for inputting the degree of importance to the importance-degree-request receiving unit 107. The importance-degree-request receiving unit 107 is a system component for receiving a command from the composer (or the user) to indicate the degree of importance (that is, a state of highlighting). An operation to specify the degree of importance for a region is explained by referring to FIG. 12. The degree of importance for a region or a category is specified by the composer either in a separate operation to enter the degree of operation, or at the same time as the operation to enter a region to be painted with a color. In either case, the composer either enters a number representing the degree of importance for a region or a category, or operates a language menu button such as "High," "Medium" or "Low" also representing the degree of importance or a slider by using a screen input user interface function through the window 120 for inputting the degree of importance shown in FIG. 12.

The color-arrangement rules stored in the color-arrangement-rule holding unit 104 of the 3rd embodiment prescribe colors used in color arrangement with the degree of importance, the hue and the area used as parameters. In the case of the 1st embodiment, the color-arrangement rules are summarized in a look-up table for obtaining actual RGB values in accordance with two parameters: the area of a region to be painted with a color and the hue of the color to be used for coloring. In the case of the 3rd embodiment, on the other hand, the color-arrangement rules are summarized in a look-up table for obtaining actual RGB values in accordance with the degree of importance in addition to the two parameters used in the 1st embodiment.

Figure 14:
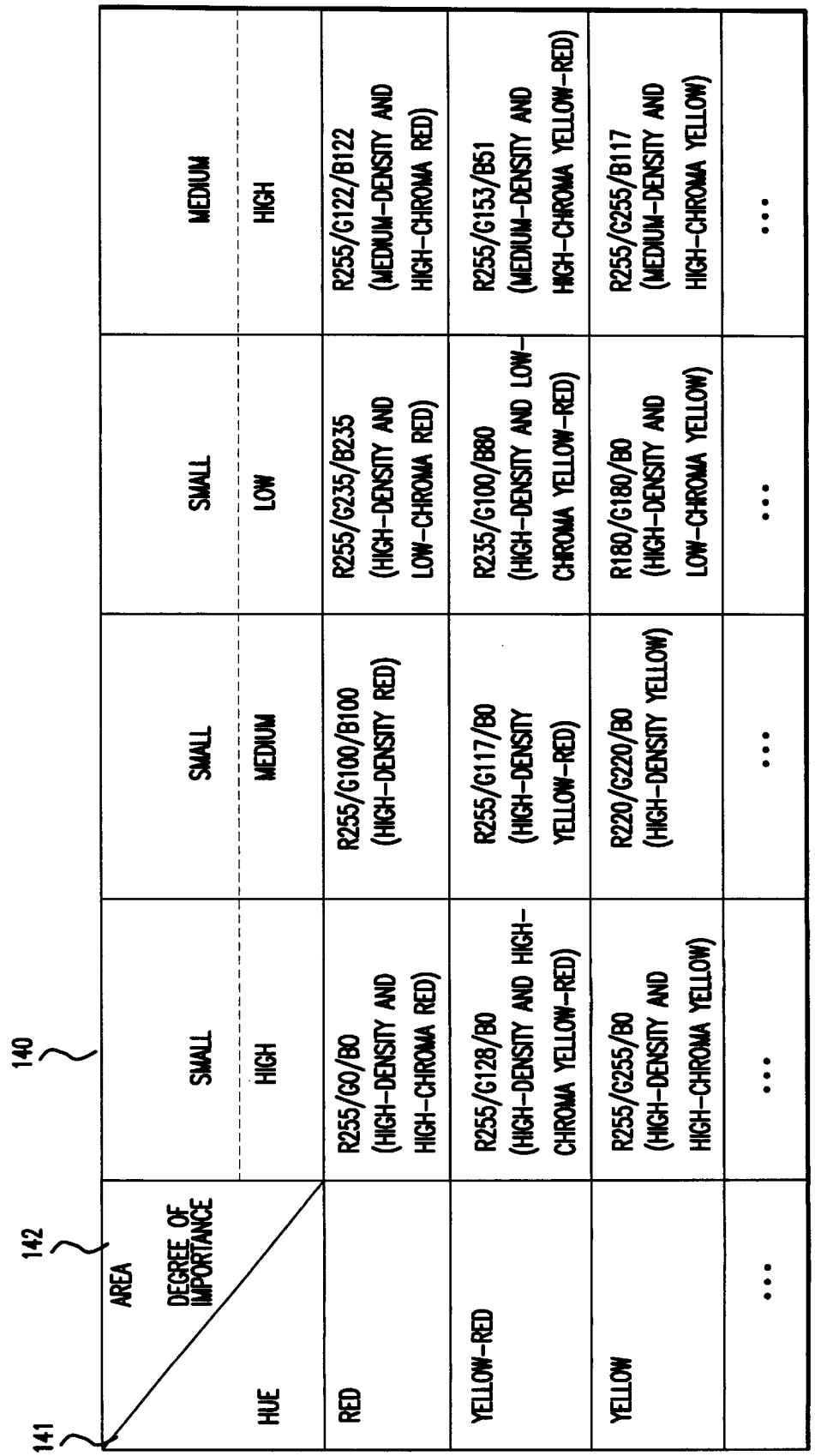
FIG. 14 is a diagram used for explaining a 2nd example of the color-arrangement rules stored the a color-arrangement-rule holding unit 104 of the 3rd embodiment.

FIGS. 13 and 14 are diagrams used respectively for explaining examples of the color-arrangement rules 130 and 140 stored in the color-arrangement-rule holding unit 104. The color-arrangement rules 130 shown in FIG. 13 prescribe RGB values of specified colors for selecting actual color-arrangement colors in accordance with the degree of importance 131 and the hue 132 of the specified region color. The color-arrangement rules are prescribed so that, the higher the degree of importance, the darker the coloring or, in other words, the lower the degree of importance, the lighter the coloring. The color-arrangement rules 130 shown in FIG. 13 are summarized in a look-up table for obtaining actual RGB values of actual color-arrangement colors in accordance with two parameters: the degree of importance 131 and the hue 132 of the color specified for coloring.

In addition, when the area of a region is used as an additional parameter of the color-arrangement rules 140, the hue is used as a parameter 141 while a combination of the degree of importance and the area is used as another parameter 142 as shown in FIG. 14. That is to say, according to the color-arrangement rules 140, high, medium and low densities are assigned to small, medium and large region areas respectively and high, medium and low chromas are assigned to high, medium and low degrees of importance of regions respectively. Along with such assignments, the color-arrangement rules 140 prescribe RGB values of specified colors for selecting actual color-arrangement colors. It is obvious from the color-arrangement rules 140 that, the higher the degree of importance, the darker the coloring or, in other words, the lower the degree of importance, the lighter the coloring and, in addition, the smaller the area of a region, the higher the chroma at which the region is painted with a color or, in other words, the larger the area of a region, the lower the chroma at which the region is painted with a color.

Figure 15:
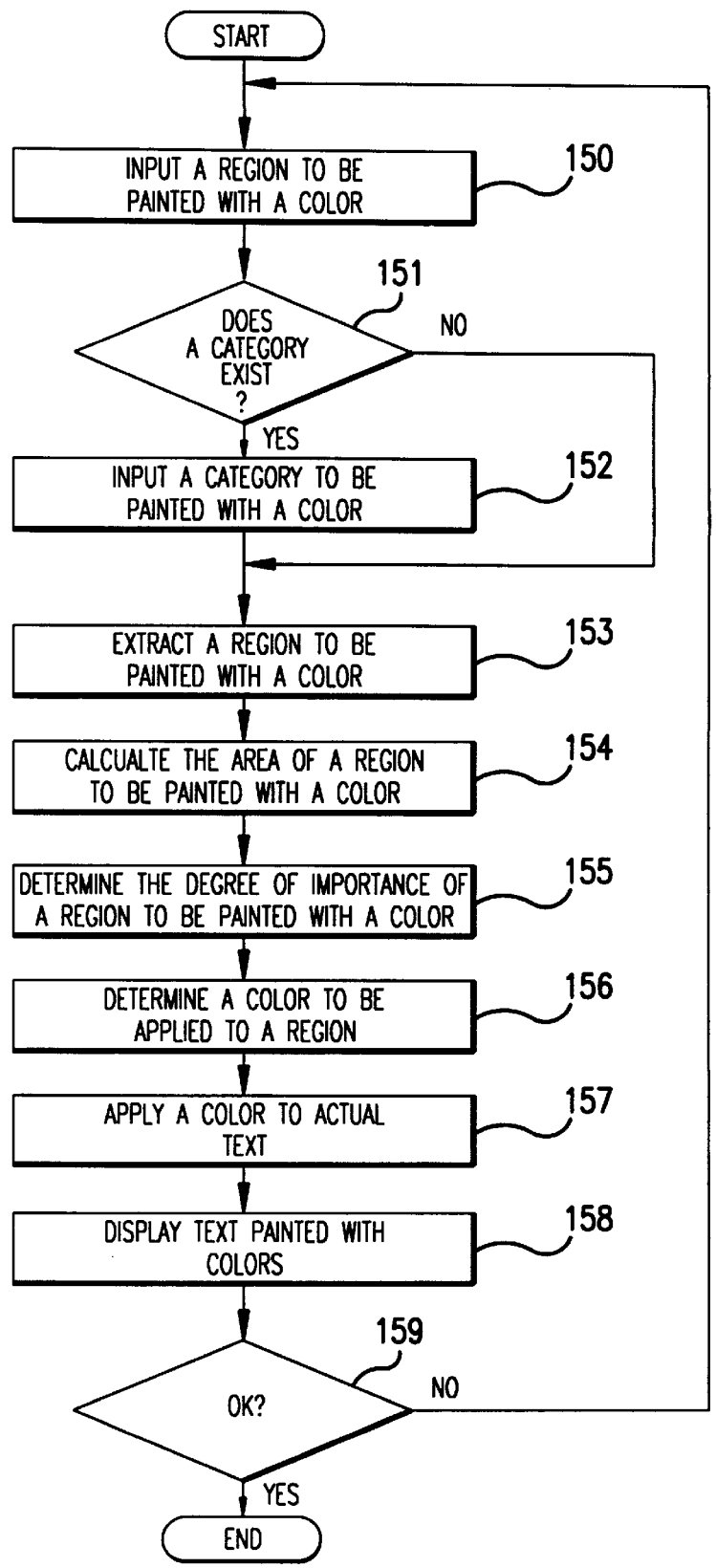
FIG. 15 is a flowchart showing a processing flow of a coloring process carried out on a region by a control unit employed in the graphic processing apparatus implemented by the 3rd embodiment in accordance with the present invention.

FIG. 15 is a flowchart showing a processing flow of a coloring process carried out on a region by a control unit employed in the graphic processing apparatus implemented by the 3rd embodiment in accordance with the present invention. Processing carried out by the control unit employed in the graphic processing apparatus implemented by the 3rd embodiment is explained by referring to the flowchart shown in FIG. 15. The processing flow of the coloring process carried out by the 3rd embodiment is basically the same as that of the 1st embodiment. Differences between them include a feature that, in the case of the 3rd embodiment, a category for collecting regions to be painted with the same color and the degree of importance can be specified.

As shown in the figure, the processing begins with a step 150 at which processing to input locations representing regions each to be painted with a color is carried out. At this step, in the first place, a scanner is controlled to let the scanner read in a text picture and temporarily store it into the text-picture memory unit 11 of the manuscript-picture holding unit 1. Then, the edit-region-request receiving unit 6 is controlled to display the picture data stored in the text-picture memory unit 11 on a window 30 for specifying regions each to be painted with a color as shown in FIG. 3. A command specifying regions each to be painted with a color of the picture is received. Subsequently, a window 40 for specifying region colors shown in FIG. 4 is displayed.

The processing flow then continues to a step 151 to determine whether or not a category exists. If a category exists, the processing flow proceeds to a step 152 to input a color used for painting the category. The processing flow then continues to a step 153. If no category exists, on the other hand, the processing flow continues from the step 151 directly to the step 153. At the step 153, processing to extract a region to be painted with a color is carried out. That is to say, when a command indicating a region to be painted with a color is received, the edit-region extracting unit 2 is controlled to perform the processing to extract the region to be edited as in the case of the 1st embodiment described previously.

In the processing to extract a region, a closed region enclosing a point specified as an object to be painted with a color is extracted. A closed region is extracted by examining the RGB values of a point higher than the specified point of the edit object by one picture element. If the RGB values represent a picture element close to the black color, the address of the picture element is stored. If the examined picture element is not close to the black color, on the other hand, the RGB values of the next upper picture element are examined. The examination of the RGB values of upper picture elements is continued one picture element after another till a black color is found. If a picture element of the black color is found, a picture element of the black color adjacent to the found picture element is next sought. In this way, all picture elements of the black color connected to each other to enclose the closed region including the specified point are identified. The picture elements of the black color enclosing the closed region including the specified point are traced, returning to the first picture element of the black color, the address of which picture element was stored. In addition, when a color in the text is specified as a region color, a closed region including a location pointed to for specifying the color is searched for a picture element, all the bits of which are neither zeros nor ones. The color of this picture element is then taken as the specified color. It should be noted that the RGB values are represented by 24-bit data.

The processing flow then proceeds to a step 154 to carry out processing to compute the area of a region to be painted with a color which processing is the same as that shown in FIG. 6. As shown in the figure, in the processing to calculate the area of a region, the number of picture elements included in a closed region extracted in a process to extract an edit region is counted as follows. First of all, the number of picture elements in a scan line (Li) is counted in the main scanning (horizontal or short-side) direction. The counting is repeated for all the scan lines Li, where i=1 to n, in the auxiliary scanning (vertical or long-side) direction in the closed region in order to find the total number of picture elements which total number represents the area of the closed region.

The processing flow then continues to a step 155 to carry out processing to identify the degree of importance for a region to be painted with a color. In the processing to determine the degree of importance for a region, the importance-degree-request receiving unit 107 is controlled in order to perform the processing to determine the degree of importance for a region in accordance with a request made by the user made through the window 120 shown in FIG. 12 for inputting the degree of importance. In this way, processing is carried out at each of the steps in order to identify the degree of importance for regions or categories.

The processing flow then continues to a step 156 to carry out processing to determine colors for regions. In the processing to determine colors for regions, colors are arranged in accordance with the areas of the regions which areas are judged by using criteria determined by picture-element counts as described earlier. That is to say, the area of a region is judged to be small, medium or large depending upon the number of picture elements in the region. The coloring of a region is then determined in accordance with the result of the judgment by abiding by the color-arrangement rules. In this case, the degree of importance is also used for determining the coloring of a region in accordance with the color-arrangement rules.

The processing flow then proceeds to a step 157 to carry out processing to apply the coloring of regions determined at the previous step to the actual text. Then, the processing flow continues to a step 158 to display the text on which the region coloring was carried on. Subsequently, the processing flow proceeds to a step 159 to display an inquiry to the user, asking the user whether or not the results of coloring the regions are good. A response to the inquiry received from the user is then evaluated. If the response received from the user confirms that the results of the region coloring are good, the processings are completed. If the user is not satisfied with the processing results, on the other hand, the processing flow returns to the step 150 to repeat the processings from the step 150.

That is to say, the region colors determined by the processing carried out so far are applied to the text picture by controlling the output-picture generating unit 4 and resulting text-picture data is temporarily stored in the output-picture memory unit 15 employed in the print-out unit 5 to be output later by the print-out unit 5. In this case, the resulting text-picture data temporarily stored in the output-picture memory unit 15 is displayed on the screen of a display unit to be previewed by the composer. If the composer is not satisfied with the results, the processings are carried out once more.

A basic difference between the graphic processing apparatus implemented by the 1st embodiment and the graphic processing apparatus implemented by the 3rd embodiment is that, in the case of the latter, a category formed by collecting regions to be painted with the same color and the degree of importance can be specified. In the specification of regions, the window 30 for specifying regions is used to specify and select, for example, two regions D and E to be painted with a color as shown in FIG. 3 and the window 40 for specifying colors is used to specify and select, for example, the color palette of the green color as shown in FIG. 4. The operations to collect the regions D and E in a 1st category and to assign the green color to this category are completed. Then, the window 120 for inputting the degree of importance is used to set the degree of importance for a region or a category as shown in FIG. 12. These operations are carried out repeatedly in order to set a hue and the degree of importance for each region or category.

After a hue and the degree of importance for each region or category have been set, a color is determined for each region or category in accordance with the hue and the degree of importance, by abiding by the color-arrangement rules shown in FIGS. 13 and 14. The color-arrangement rules prescribe such a relation between the degree of importance and the density that, the higher the degree of importance, the higher the density of the color. Accordingly, a region with a high degree of importance is painted with a color having such a density that the region becomes striking.

Figure 16:
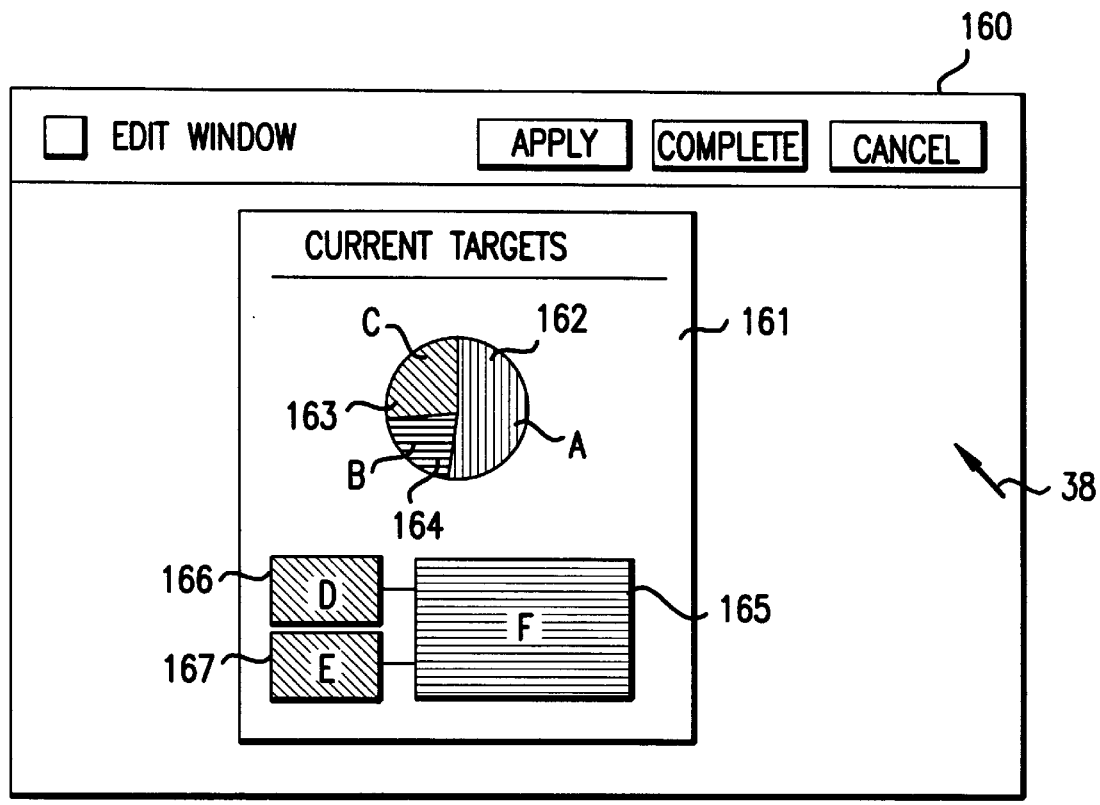
FIG. 16 is a diagram used for explaining coloring of regions of a text picture wherein the density of a color assigned to each of the regions in the text is determined in accordance with the degree of importance of the region.

FIG. 16 is a diagram used for explaining coloring of regions of a text picture wherein the density of a color assigned to each of the regions in the text is determined in accordance with the degree of importance. As described earlier, when the degrees of importance for regions A and B are set at a high level through the window 120 for inputting the degree of importance shown in FIG. 12, the regions A and B are each painted with a dark color as shown in FIG. 16, to result in a text picture with the regions A and B highlighted.

That is to say, as a result of setting the degrees of importance for regions A and B at a high level, dark-red and dark-blue colors are determined for the regions A and B respectively in accordance with coloring conforming to the color-arrangement rules. In addition, a light-green color is determined for regions C, D and E whereas a light-blue color is assigned to a region F. This state of coloring is displayed on an edit window 160 used for previewing a text picture 161 as shown in FIG. 16. As shown in the figure, regions 162 and 163 of the text picture 161 are painted with dark-red and light-green colors respectively. In addition, a region 164 is painted with a dark-blue color whereas a region 165 is painted with a light-blue color. Regions 166 and 167 are both painted with a light-green color. In this way, regions in a text picture are each painted with a color with such a density that, the higher the degree of importance set for a region, the darker the color applied to the region or, in other words, the lower the degree of importance set for a region, the lighter the color applied to the region.

Next, a modified version of the 3rd embodiment is explained. In general, the system components composing the 3rd embodiment are identical with those of the 1st embodiment. For example, the color/category-request receiving unit 106 can be devised so that, in the case of a colored manuscript, the color of the manuscript itself is read out thereby and used as a specified color. In the case of a closed region having a plurality of colors, a color painted on a largest number of picture elements is treated as a specified color or, as an alternative, an interactive sub-window is displayed to the user and used for receiving a select command from the user which command indicates a specified color.

As for the specification of a category, after some regions to be grouped into a category have been specified in accordance with a command entered by the user, a category number is then specified for the regions through the window 110 for inputting region categories shown in FIG. 11. Then, a color to be applied to the regions of the category is specified through the window 40 for specifying region colors shown in FIG. 4. As an alternative, a color to be applied to the regions of the category can be specified through the window 40 for specifying region colors by skipping the operation to specify a category number for the regions through the window 110. In this case, a category number is assigned to the category automatically in an order in which categories numbers 1, 2 and so on are displayed on the window 110. Then, the operation to specify some regions to be grouped into a category can be repeated.

In addition, the color-arrangement rules stored in the color-arrangement-rule holding unit 104 can also be modified in a variety of ways. The basic regulation with respect to the degree of importance in the color-arrangement rules can also state that, the higher the degree of importance, the higher the chroma. The color-arrangement rules which take the degree of importance as a parameter can be set so that, a vivid color such as red, pink or orange is assigned to a region with a high degree of importance while a non-vivid color such as blue or green is assigned to a region with a low degree of importance when the user does not specifically specify a hue in the category specification.

If colors are arranged in accordance with the color-arrangement rules stored in the color-arrangement-rule holding unit 104 which rules take the degree of importance and the region area as parameters, an effect to make the quality of the text picture even higher can be resulted in. This is because variations in highlighting state among regions caused by differences in area are eliminated and, on the top of that, a region with a high degree of importance can be highlighted. Let us take a look, for example, at FIG. 17 which shows a diagram used for explaining an example of density determination based on the region area and the degree of importance. On the edit window 170 shown in the figure, a high degree of importance is specified for regions A and B. As for the areas of regions, operations carried out by the region-area determining unit 13 put regions in area ranges as follows: the region A in the medium range, the region B in the small range, a region C in the medium range, a region D in the medium range, a region E in the medium range and a region F in the large range. With the specification of a degree of importance and determination of ranges for region areas described above, regions are each painted with a color as shown in the example of the figure. Having an area larger than the region B, the region A is painted with a color lighter than the color for the region B. In addition, since the area F has a large area, painting the region F with a color of the same density will make it striking. For this reason, the region F is painted with a lightest color.

Figure 17:
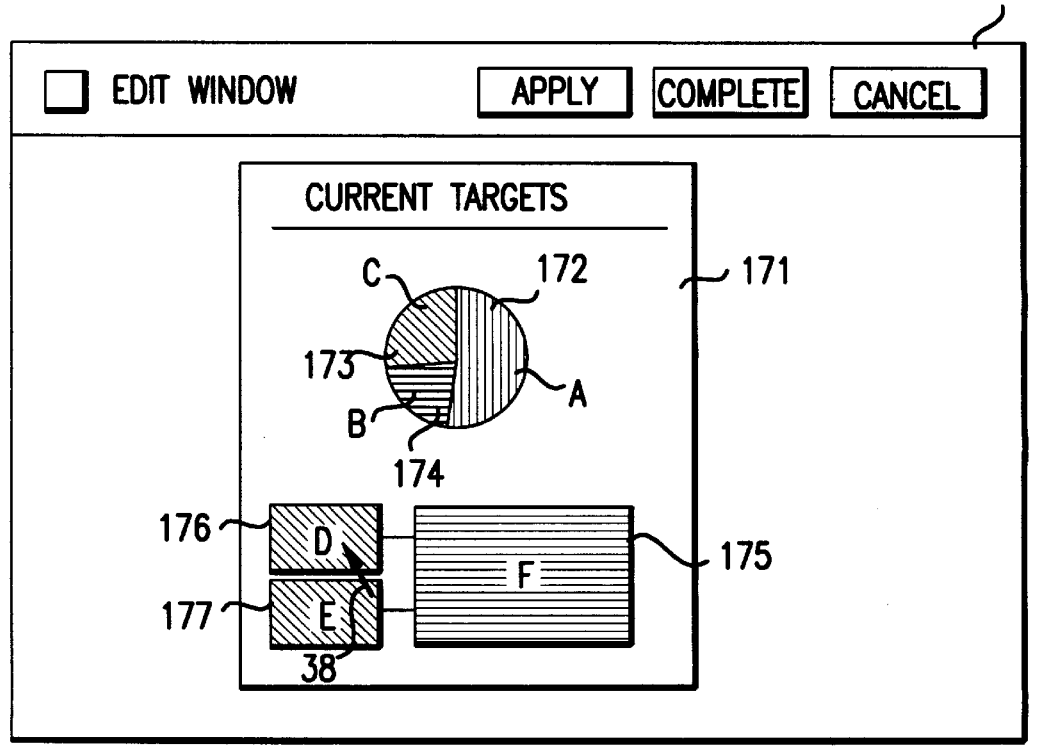
FIG. 17 shows a diagram used for explaining an example of determination of densities in accordance with the region area and the degree of importance.

As a result, at the window 170 shown in FIG. 17 for previewing a text picture 171, regions 172 and 173 of the text picture 171 are painted with slightly-dark-red and medium-green colors respectively. In addition, a region 174 is painted with a dark-blue color whereas a region 175 is painted with a light-blue color. Regions 176 and 177 are both painted with a medium-green color.

Figure 18:
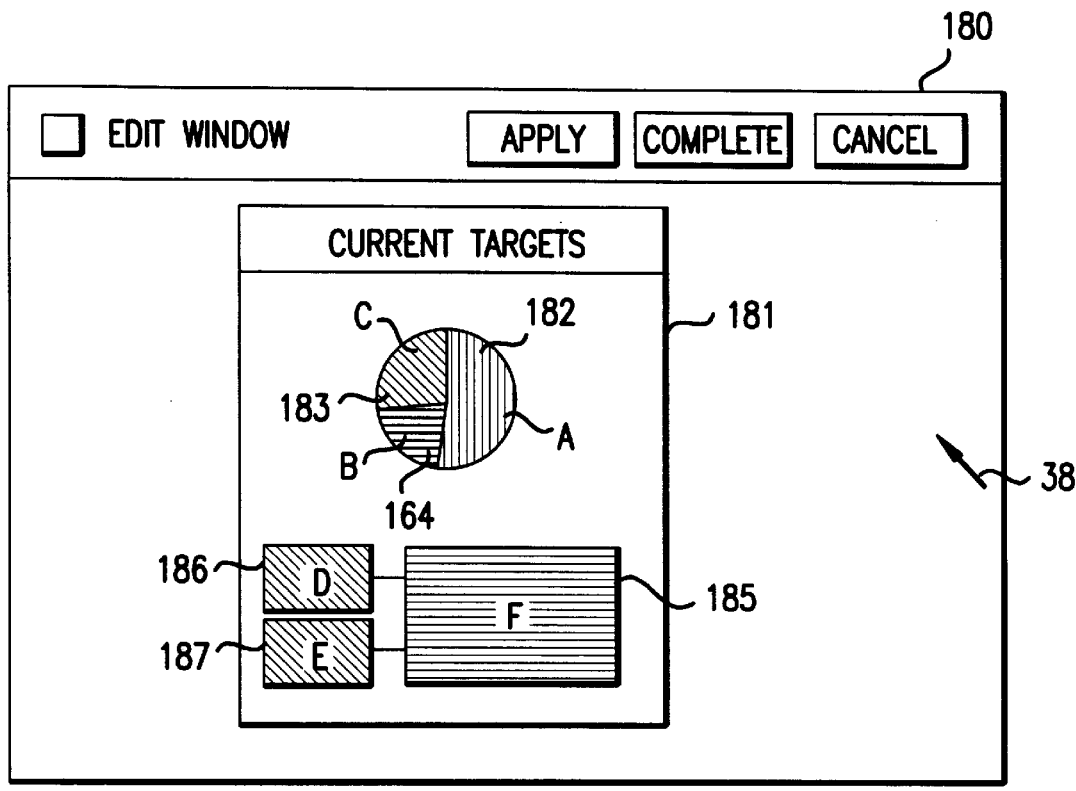
FIG. 18 shows an example of determination of the density and the chroma of a color to be applied to a region in accordance with a combination of the area and the degree of importance of the region.

In this case, if a color is expressed by combining the differences in chroma and hue in addition to the density, the highlighting state of a region can be controlled more finely as is the case with the 1st embodiment. In this case, knowledge included in the color-arrangement rules can be summarized into a table such as the one shown in FIG. 14. As shown in the figure, the table is used for determining the density and the chroma of a color for a region in accordance with a combination of the area and the degree of importance of the region. An example of coloring regions in accordance with such color-arrangement rules is shown in FIG. 18. As shown in the figure, there is a case in which the density and the chroma of a color for a region are determined in accordance with a combination of the area and the degree of importance of the region. Much like the example of coloring shown in FIG. 17, at the window 180 shown in FIG. 18 for previewing a text picture 181, a high degree of importance is specified in advance for regions A and B. As for the areas of regions, regions are put in area ranges as follows: the region A in the medium range, the region B in the small range, a region C in the medium range, a region D in the medium range, a region E in the medium range and a region F in the large range. As a result, regions 182 and 183 of the text picture 181 are painted with a color having a medium density and a high chroma and a color having a medium density and a medium chroma respectively. In addition, a region 184 is painted with a color having a high density and a high chroma whereas a region 185 is painted with a color having a low density and a medium chroma. Regions 186 and 187 are both painted with a color having a medium density and a medium chroma.

In this way, differences in density result in a state as if differences in areas were eliminated. In addition, the areas A and B which both have a high degree of importance are each highlighted with a color each having a high chroma. It is needless to say that a region can also be highlighted using a difference in hue instead of chroma. That is to say, a region with a high degree of importance is painted with a vivid color while a region with a low degree of importance is painted with a non-vivid color to give the same effect. On the top of that, if the color-arrangement rules are set so that a color difference can be expressed by using an aggregate combination of the density, the chroma and the hue, the highlighting state of a region can be controlled even more finely.

Figure 19:
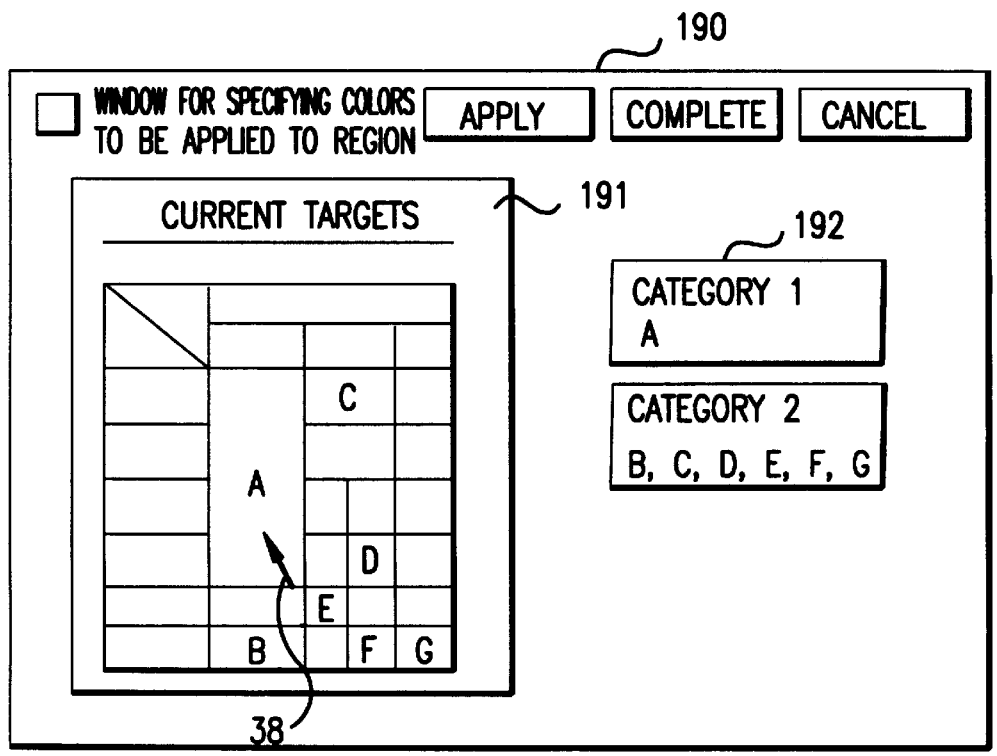
FIG. 19 shows typical operations to carry out coloring by categorizing regions to be painted with a color.

Next, typical operations to carry out coloring by categorizing regions to be painted with a color are explained. As shown in FIG. 19, a manuscript picture 191 including regions A to G is read in to the text-picture memory unit and displayed on a window 190 for specifying regions to be painted with a color. In addition, a sub-window 192 for specifying categories is opened. Through the sub-window 192, commands to categorize the regions are entered by operating the pointing device 38 so that the region A is included in category 1 whereas regions B to G are grouped in category 2. In this case, regions grouped in the same category are painted with the same color in accordance with the basic regulation of the control-arrangement rules. However, there is another regulation in the control-arrangement rules stating that a region with a large area should be painted with a light color while a region with a small area should be painted with a dark color. If a category includes regions with small and large areas, the color arrangement will greatly change depending upon whether the regions in the category is painted with a dark or light color.

It is generally believed that if a category includes a number of regions painted with the same color, the category will be striking. In this case, a regulation requiring that a category having a large total of region areas be painted with a light color therefore needs to be added to the control-arrangement rules as a concept that can be embraced in the control arrangement. With the additional regulation, a category including a plurality of regions can be painted with an appropriate color. An example of coloring categorized regions in accordance with color-arrangement rules based on this concept is shown in FIG. 20.

Figure 20:
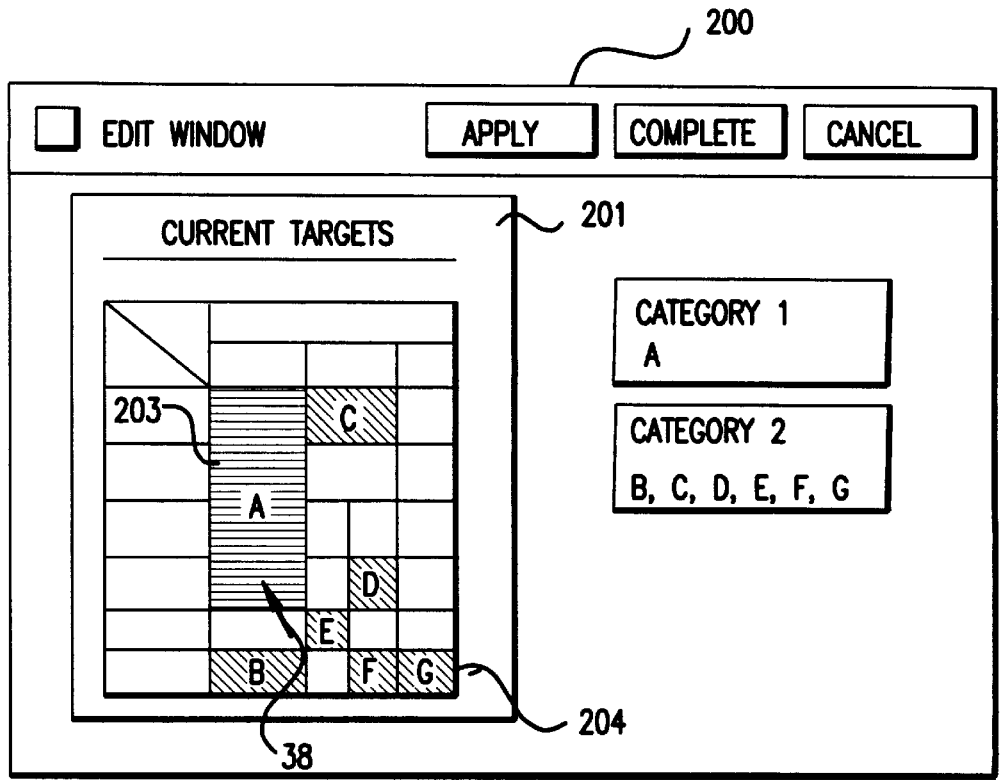
FIG. 20 is a diagram used for explaining an example of determination of densities according to the total number of region areas pertaining to a category.

FIG. 20 is a diagram used for explaining an example of determination of densities according to the total number of region areas pertaining to a category. The control-arrangement rules are used for determining a color density for a category in accordance with the total of region areas of the category. In the example, the total of region areas of category 1 comprising the region A is smaller than the total of region areas of category 2 comprising the regions B, C, D, E, F and G. Accordingly, a region 203 in category 1 is painted with a light color whereas regions 204 in category 2 are painted with an even lighter color. In actuality, in an edit window 200 for previewing a manuscript picture, the region 203 in category 1 of an edited picture 201 is painted with a light-blue color whereas the regions 204 in category 2 are painted with a very-light-green color.

Figure 21:
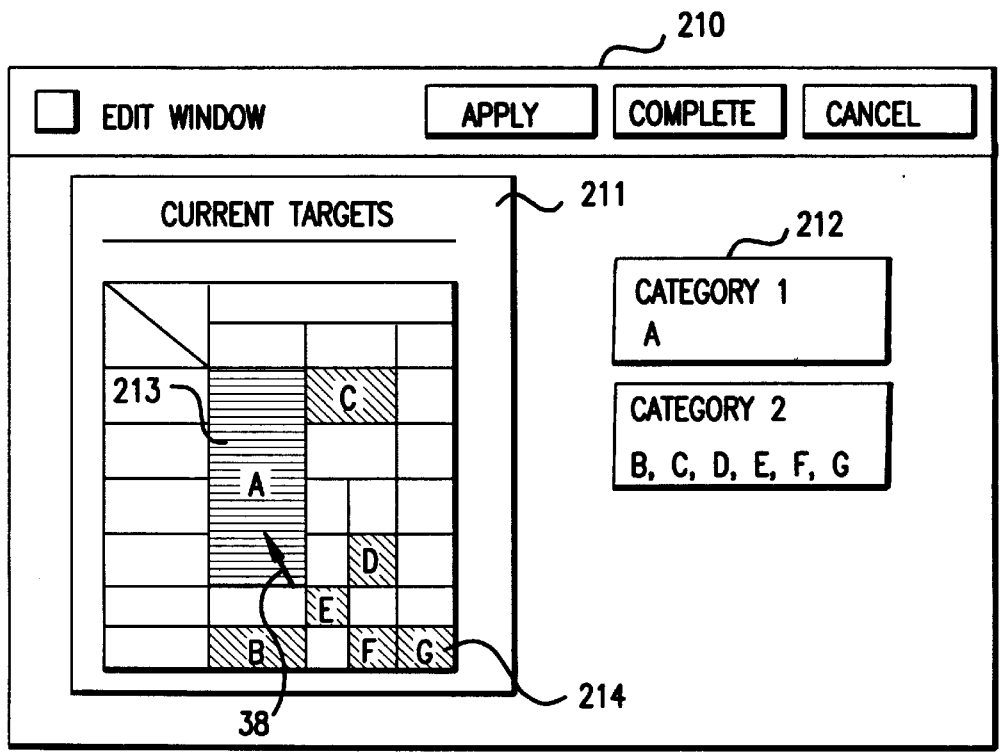
FIG. 21 is a diagram used for explaining an example of determination of densities according to the largest area among regions pertaining to a category.

According to another concept embraced in the control-arrangement rules, a region having the largest area in a category is most influential so that the color of the entire category is determined in accordance with the area of the region. FIG. 21 is a diagram used for explaining an example of determination of densities according to the largest region area among regions pertaining to a category. The control-arrangement rules are used for determining a color density for a category in accordance with the largest region area in the category. In the example, the largest region area of category 1 comprising the region A is greater than the largest region area of category 2 comprising the regions B, C, D, E, F and G. Accordingly, a region 213 in category 1 is painted with a light color whereas regions 214 in category 2 are painted with a medium color. In actuality, in an edit window 210 for previewing a manuscript picture, the region 213 in category 1 of an edited picture 211 is painted with a light-blue color whereas the regions 204 in category 2 are painted with a medium green color.

In the case of text comprising a plurality of pages, a category may include regions on more than one page. In this case, the contents of all the pages are read in to the text memory unit and, by treating them as a batch, the text can be processed as if the text were all written on a single page.

[Fourth Embodiment]

Much like the 2nd embodiment, the 3rd embodiment implements the graphic processing apparatus provided by the present invention in a copy machine. On the other hand, a graphic processing apparatus of the present invention implemented in a workstation is explained as a 4th embodiment. The 4th embodiment implements the example of a copy machine implemented by the 3rd embodiment in a workstation (W/S).

The configuration of the graphic processing apparatus implemented by the 4th embodiment is the same as the configuration of the 3rd embodiment shown in FIG. 3. In addition, the system components other than the color/category-request receiving unit 106 and the importance-degree-request receiving unit 107 shown in FIG. 10 each have the same configuration as those of the 2nd embodiment. It is thus not necessary to repeat the description of those system components in the explanation of the 4th embodiment. The explanation covers only differences between the system components.

The color/category-request receiving unit, one of the system components composing the graphic processing apparatus implemented by the 4th embodiment, facilitates specification of a color for each region by typically opening a sub-window of the region-color specification window 40 shown in FIG. 4, one of edit windows of a text editor. As an alternative, the specification of a color for each region is implemented by opening a color-name menu or color palettes from a menu bar of an edit window and moving a pointer cursor so as to point to a desired color through operation of a pointing device such as a mouse.

In addition, in the case of a colored manuscript picture, color attributes of a specified region are read in and the values thereof can be used as a specified color. Moreover, instead of specifying a color directly for each region, a color table set separately can be used for specifying a color. In addition, if it is desired to paint a plurality of regions with the same color, the regions can be handled as a category. In this case, after several regions have been specified, a window 110 for inputting region categories like the one shown in FIG. 11 is used for specifying a category number or the like. As an alternative, after several regions have been specified, a window 40 for specifying a region color shown in FIG. 4 can also be used for directly specifying a region color for each of the regions and, of course, a category can also be specified at the same time. The operations are the same as those carried out in the embodiments described so far. After all, in the case of the 4th embodiment, data handled thereby is code information.

Much like the 3rd embodiment, the importance-degree-request receiving unit, one of the system components composing the 4th embodiment, is a processing module which allows the composer to determine the degree of importance for each region or each category. The degree of importance for a region or a category is specified by the composer either in a separate operation to enter the degree of importance, or at the same time as the operation to enter a region to be painted with a color. In either case, the composer (or the user) either enters a number representing the degree of importance for a region or a category, or operates a language menu button such as "High," "Medium" or "Low" also representing the degree of importance or a slider through the window 120 for inputting the degree of importance shown in FIG. 12.

In addition, instead of entering the degree of importance manually, the composer (that is, the user) can determine the degree of importance for a region or a category based on information on the degree of importance stored in a data base. For example, the data base includes a list of people, to whom text is to be distributed. In this case, a region in the text that matches the distribution list is judged as a region having a high degree of importance. Therefore, a high degree of importance is assigned to the region. These kinds of processing are each implemented by using a processing module which can be customized freely by the user.

The operation procedure of the graphic processing apparatus implemented by the 4th embodiment having a configuration described above is the same as the processing flow of the 3rd embodiment shown in FIG. 15. In addition, the operation of the manuscript-picture holding unit is the same as that of the 2nd embodiment while the operations of the other system components are the same as those of the 3rd embodiment.

[Fifth Embodiment]

With the 1st to 4th embodiments explained so far, regions of a text picture are each painted with a color to result in a high-quality text picture. Instead of the coloring parameters, hatching designs and hatching patterns and densities can be specified. The configuration of a graphic processing apparatus for producing high-quality text pictures through hatching is explained as a 5th embodiment.

In a graphic processing apparatus implemented by the 5th embodiment, the user can specify a region in a text picture to be hatched, a hatching design/pattern for each region, regions to be hatched with the same hatching design/pattern, a category grouping a plurality of regions to be hatched with the same hatching design/pattern and the degree of importance for each region or each category, requesting the system to generate a high-quality picture with hatching designs/patterns and hatching densities thereof determined in accordance with information on the area and the degree of importance for each region or each category to be hatched.

Figure 22:
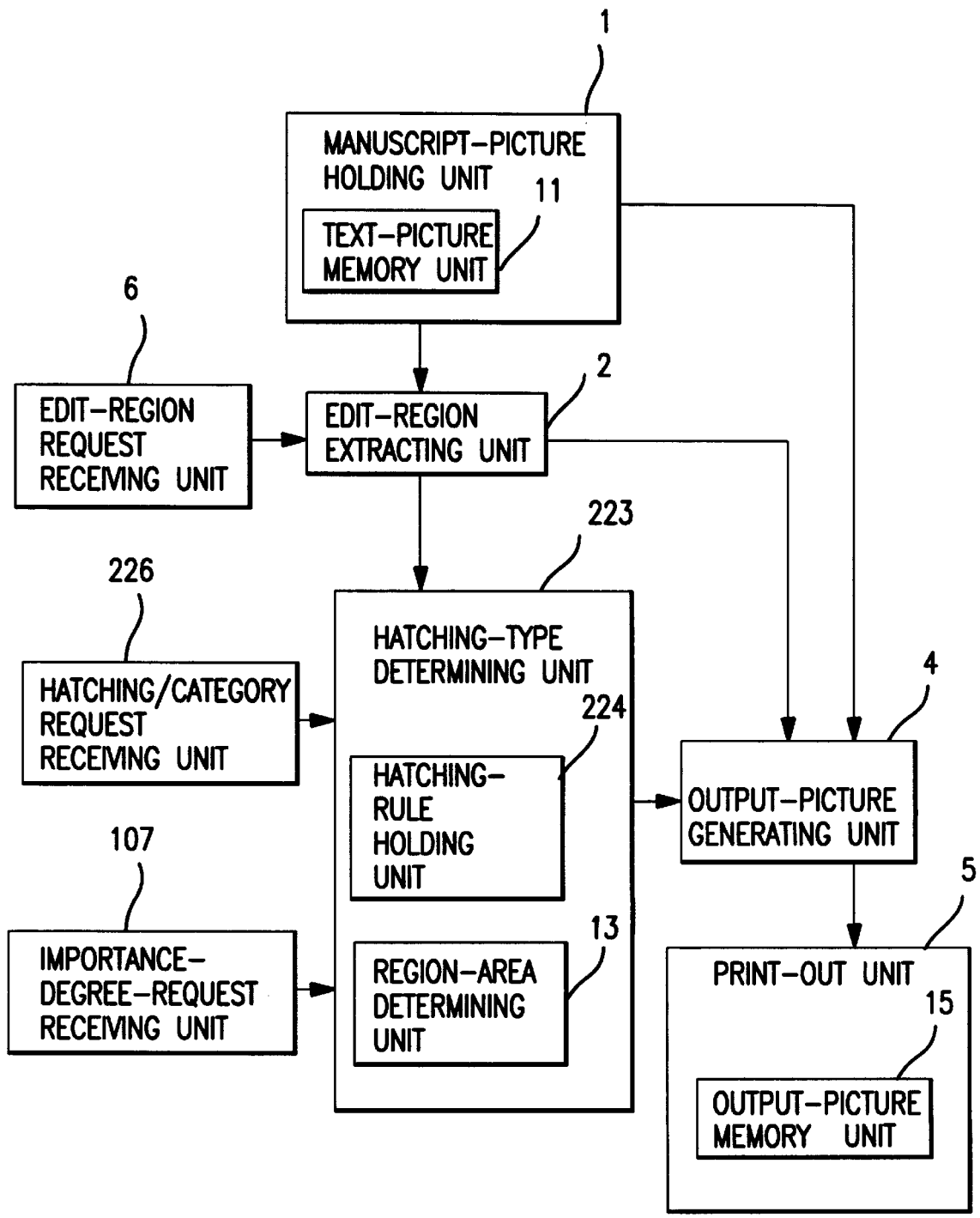
FIG. 22 is a diagram showing an overall system configuration of a graphic processing apparatus as implemented by a 5th embodiment in accordance with the present invention.

FIG. 22 is a diagram showing an overall system configuration of a graphic processing apparatus as implemented by the 5th embodiment in accordance with the present invention. Reference numeral 1 shown in the figure is a manuscript-picture holding unit whereas reference numeral 2 denotes an edit-region extracting unit. Reference numeral 4 is an output-picture generating unit. Reference numeral 5 denotes a printout unit whereas reference numeral 6 is an edit-region-request receiving unit. Reference numeral 11 denotes a text-picture memory unit and reference numeral 13 is a region-area determining unit. Reference numeral 15 denotes an output-picture memory unit. Reference numerals 107 and 223 are an importance-degree-request receiving unit and a hatching-type determining unit respectively. Reference numeral 224 denotes a hatching-regulation holding unit whereas reference numeral 226 is a hatching/category-request receiving unit.

System components in the configuration of the graphic processing apparatus implemented by the 5th embodiment shown in FIG. 22 which components are identical with those employed in the configuration of the graphic processing apparatus implemented by the 3rd embodiment are denoted by the same reference numerals as those used in the configuration of the graphic processing apparatus implemented by the 1st embodiment. System components in the configuration of the graphic processing apparatus implemented by the 5th embodiment shown in FIG. 22 which components are identical with those employed in the configuration of the graphic processing apparatus implemented by the 3rd embodiment are the manuscript-picture holding unit 1, the edit-region extracting unit 2, the output-picture generating unit 4, the print-out unit 5, the edit-region-request receiving unit 6, the text-picture memory unit 11, the region-area determining unit 13, the output-picture memory unit 15 and the importance-degree-request receiving unit 107.

In the configuration of the graphic processing apparatus implemented by the 5th embodiment, the hatching/category-request receiving unit 226 is provided as a system component serving as a substitute for the color/category-request receiving unit 106 employed in the 3rd embodiment shown in FIG. 10. In conformity with this substitution, the hatching-regulation holding unit 224 is provided as a system component serving as a substitute for the color-arrangement-rule holding unit 104. In the hatching-regulation holding unit 224, hatching-arrangement rules which prescribe hatching in accordance with parameters including the hatching design/pattern, the category and the degree of importance are stored. The hatching-type determining unit 223 determines the hatching density (that is, the dot density) of hatching to be applied to each region in accordance with, among other parameters, the area of the region, the category and the degree of importance by abiding by the hatching-arrangement rules.

That is to say, in place of coloring carried out by the graphic processing apparatus implemented by the 3rd embodiment, the graphic processing apparatus implemented by the 5th embodiment performs hatching. The difference between the coloring and the hatching is that, in the case of the former, the three parameters, that is, the color density, the chroma and the color-phase difference, are varied while, in the case of the latter, only the density (that is, the dot density) is varied. For example, instead of painting a region with a color having a high density, a region is hatched at a high dot density or with small segment gaps in each slanting hatching line. A hatching design/pattern is determined by the thickness of the slanting hatching lines and the number of hatching overlaps in addition to the hatching density itself.

Next, the system components composing the graphic processing apparatus implemented by the 5th embodiment are explained. The color/category-request receiving unit 106 receives a request made by the composer (that is, the user) indicating a hatching design/pattern to be used in the hatching of a region or a group (or category) of regions to be hatched with the same hatching design/pattern. In the case of a text picture including a plurality of regions to be hatched with the same hatching design and pattern, for example, these regions are handled as a category. Therefore, for these regions, a category representing them is specified.

Figure 23:
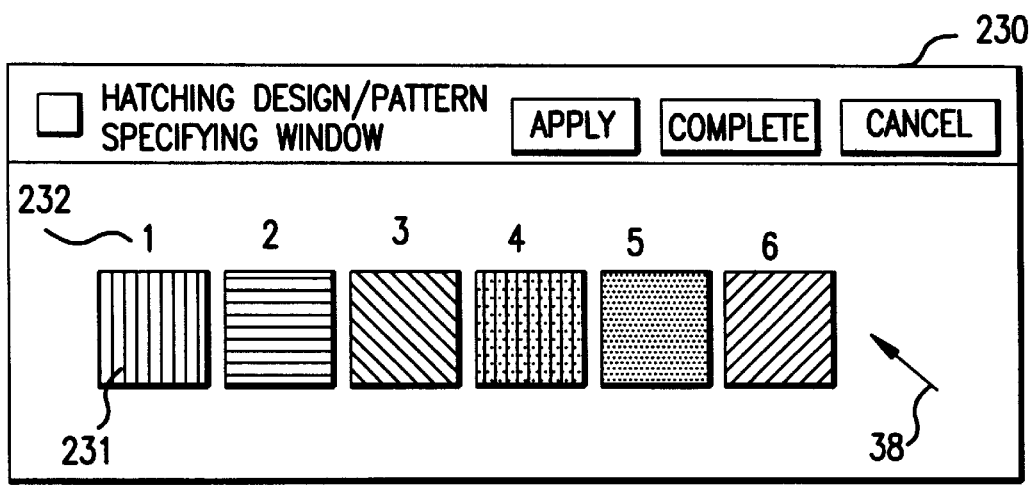
FIG. 23 is a diagram showing an example of a window for specifying a hatching design and a hatching pattern to the hatching/category-request receiving unit 226.

FIG. 23 is a diagram showing an example of a window 230 for specifying a hatching design/pattern through the hatching/category-request receiving unit 226. Operations to specify a hatching design/pattern and a category are explained by referring to this figure. First of all, regions to be edited are specified to the edit-region-request receiving unit 6 through a region specifying window like the window 30 shown in FIG. 3 for specifying regions each to be painted with a color. As shown in FIG. 23, a hatching design/pattern 231 and a category number 232 on the hatching specifying window 230 are then specified for the regions by operating the pointing device 38. That is to say, after some regions have been specified, a hatching design/pattern and a category number are assigned to the specified regions by using the hatching specifying window 230. In this way, the same category number is assigned to a plurality of specified regions and, at the same time, a hatching design/pattern is specified for a category denoted by the number.

Figure 24:
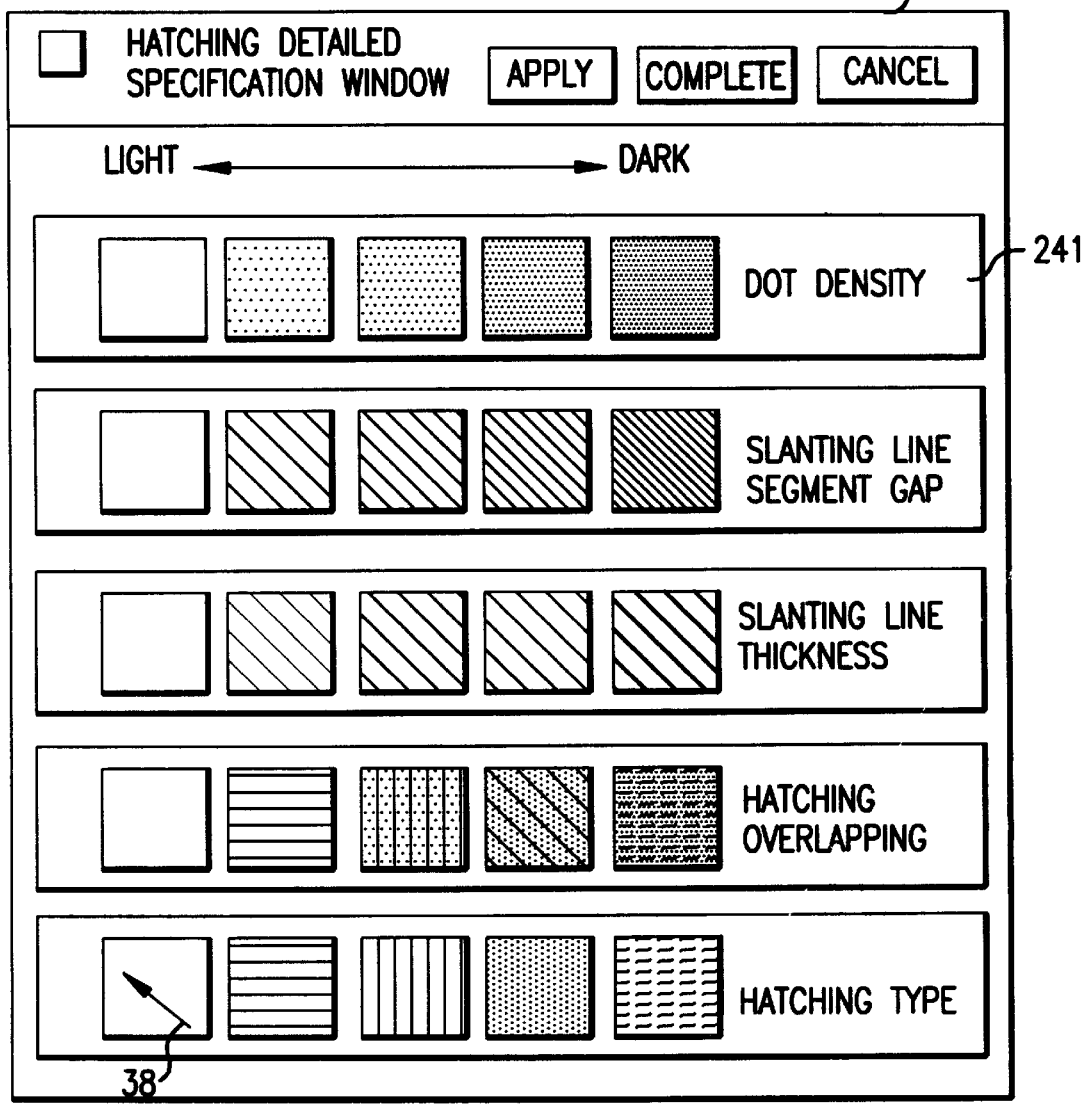
FIG. 24 is a diagram showing an example of a hatching detailed specification window.

A hatching design/pattern is specified for a category representing a plurality of regions by using a hatching detailed specification window 240 shown in FIG. 24. As shown in the figure, hatching details specified for regions are hatching attributes 241 which include a dot density, a slanting-line segment gap, a slanting-line thickness, the number of hatching overlaps and a hatching type. In addition, a hatching type can be specified for a category by specifying a hatching name.

The hatching rules stored in the hatching-regulation holding unit 224 of the 5th embodiment prescribe the hatching density with the degree of importance, the hatching type and the region area taken as parameters. That is to say, the hatching rules of the 5th embodiment are used for determining the density of hatching dots in accordance with a combination of the region area and the degree of importance. As shown in the hatching detailed specification window 240 of FIG. 24, a range of dot densities, a range of slanting-line segment gaps, a range of slanting-line thickness values, a range of hatching-overlap counts and a variety of hatching types are provided. Hatching detailed designs and patterns are determined in accordance with hatching rules which state: "A region having a large area is hatched at a low density, a region having a small area is hatched at a high density, a region having a low degree of importance is hatched at a low density and a region having a high degree of importance is hatched at a high density."

Figure 25:
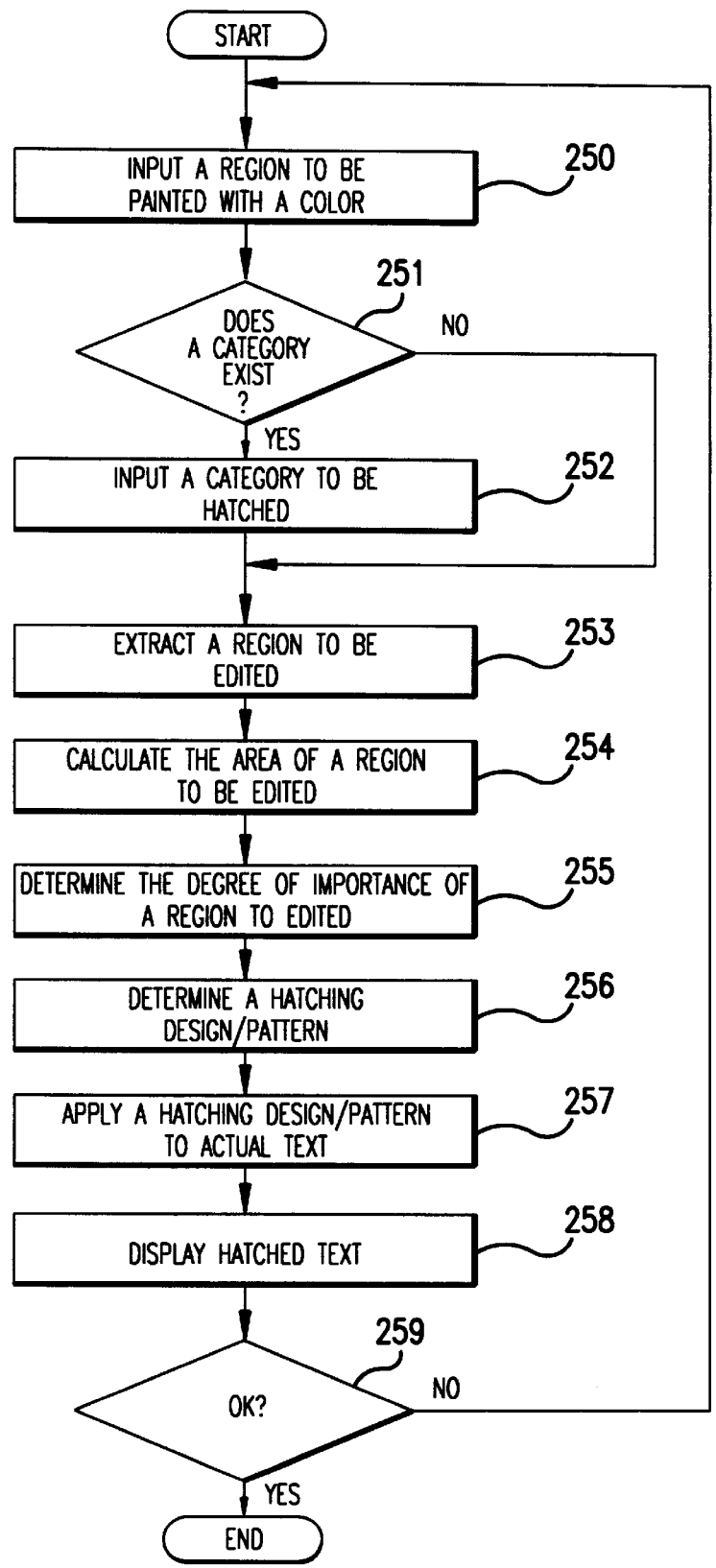
FIG. 25 is a flowchart showing the processing flow of a hatching process carried out by a control unit of the graphic processing apparatus implemented by the 5th embodiment in accordance with the present invention on regions to be hatched.

FIG. 25 is a flowchart showing the processing flow of a hatching process carried out by a control unit of the graphic processing apparatus implemented by the 5th embodiment in accordance with the present invention on regions to be hatched. The hatching process carried out by the control unit of the graphic processing apparatus implemented by the 5th embodiment is explained by referring to the flowchart shown in FIG. 25. The processing flow of the hatching process carried out by the 5th embodiment is basically the same as that of the 3rd embodiment. The difference is that instead of painting a region with a color in the 3rd embodiment, in the case of the 5th embodiment, an edit region is hatched.

As shown in the figure, the processing begins with a step 250 at which processing to input locations representing regions to be edited is carried out. At this step, in the first place, a scanner is controlled to let the scanner read in a text picture and temporarily store it into the text-picture memory unit 11 of the manuscript-picture holding unit 1. Then, the edit-region-request receiving unit 6 is controlled to display the picture data stored in the text-picture memory unit 11 on a window 30 for specifying regions to be edited. A command specifying regions to be hatched in the picture is received. Subsequently, a window 240 for specifying detailed hatching designs and patterns shown in FIG. 24 is displayed.

The processing flow then continues to a step 251 to determine whether or not a category exists. If a category exists, the processing flow proceeds to a step 252 to input hatching designs and patterns for the category. A hatching design and a hatching pattern can be specified through, typically, the hatching specifying window 230 shown in FIG. 23. The processing flow then continues to a step 253. If no category exists, on the other hand, the processing flow continues from the step 251 directly to the step 253. At the step 253, processing to extract a region to be edited is carried out. That is to say, when a command indicating a region to be edited is received, the edit-region extracting unit 2 is controlled to perform the processing to extract a region to be edited as in the case described previously.

The processing flow then proceeds to a step 254 to carry out processing to compute the area of a region to be edited which processing is the same as that shown in FIG. 6. As shown in the figure, in the processing to calculate the area of a region to be edited, the number of picture elements included in a closed region extracted in a process to extract the region to be edited is counted as follows. First of all, the number of picture elements in a scan line (Li) is counted in the main scanning (horizontal or short-side) direction. The counting is repeated for all the scan lines Li, where i=1 to n, in the auxiliary scanning (vertical or long-side) direction in the closed region in order to find the total number of picture elements which total number represents the area of the closed region.

The processing flow then continues to a step 255 to carry out processing to identify the degree of importance for a region to be edited. In the processing to determine the degree of importance for a region, the importance-degree-request receiving unit 107 is controlled in order to perform the processing to determine the degree of importance for a region in accordance with a request made by the user made through the window 120 shown in FIG. 12 for inputting the degree of importance. In this way, processing is carried out at each of the steps in order to identify the degree of importance for regions or categories.

The processing flow then continues to a step 256 to carry out processing to determine hatching designs and hatching patterns for regions. In the processing to determine hatching designs and hatching patterns for regions, hatching densities are arranged in accordance with the areas of the regions which areas are judged by using criteria determined by picture-element counts as described earlier. That is to say, the area of a region is judged to be small, medium or large depending upon the number of picture elements included in the region. The hatching density of a region is then determined in accordance with the result of the judgment by abiding by the color-arrangement rules. In this case, the degree of importance is further used for determining the coloring of a region in accordance with the color-arrangement rules.

The processing flow then proceeds to a step 257 to carry out processing to apply the hatching of regions determined at the previous step to the actual text. Then, the processing flow continues to a step 258 to display the text to which the region hatching was applied. Subsequently, the processing flow proceeds to a step 259 to display an inquiry to the user, asking the user whether or not the results of hatching the regions are good. A response to the inquiry received from the user is then evaluated. If the response received from the user confirms that the results of the region hatching are good, the processing is completed. If the user is not satisfied with the processing results, on the other hand, the processing flow returns to the step 250 to repeat the processings from the step 250.

That is to say, the region hatching designs and hatching patterns determined by the processing carried out so far are applied to the text picture by controlling the output-picture generating unit 4 and resulting text-picture data is stored temporarily in the output-picture memory unit 15 employed in the print-out unit 5 to be output later by the print-out unit 5. In this case, the resulting text-picture data stored in the output-picture memory unit 15 is displayed on the screen of a display unit to be previewed by the composer. If the composer is not satisfied with the results, the processings are carried out once more.

What is claimed is:

1. A graphic processing apparatus that changes appearances of selected regions of an image, comprising:

a memory that temporarily stores the image;

a region selector that allows a plurality of regions of the image to be selected;

an appearance alterer that alters an appearance of each of the plurality of selected regions at the same time, the altered appearances of the plurality of selected regions being different from one another; and an outputter that outputs the image, the selected regions of the output image having the altered appearances.

2. The graphic processing apparatus of claim 1, wherein the plurality of region appearances are differentiated by at least one of color and hatching.

3. The graphic processing apparatus of claim 2, wherein the hatching is at least one of hatching designs and hatching patterns.

4. The graphic processing apparatus of claim 3, wherein the hatching designs and hatching patterns are differentiated by hatching density.

5. The graphic processing apparatus of claim 4, wherein the difference in hatching density is at least a difference in dot density, a difference in hatching segment gap, a difference in hatching-line thickness and a difference in hatching-overlap count.

6. The graphic processing apparatus of claim 1, further comprising a region appearance selector that selects the appearance for each of the plurality of selected regions based on at least one of an area and an importance of that selected region.

7. The graphic processing apparatus of claim 6, wherein each of the plurality of selected regions is one of at least one category, a characteristic of each category based on the at least one of the areas and the importances of the at least one selected region included in that category; and the at least one category is differentiated from one another by differences in the characteristics of each of the at least one category.

8. The graphic processing apparatus of claim 7, wherein for each of the at least one category, the characteristic of that category is determined in accordance with a sum of the areas of the at least one selected region included in that category.

9. The graphic processing apparatus of claim 7, wherein for each of the at least one category, the characteristic of that category is determined in accordance with a largest area of the at least one selected region included in that category.

10. The graphic processing apparatus of claim 1, further comprising an importance-degree determiner that determines degrees of indicated importance for each of the plurality of selected regions, wherein, for each of the plurality of selected regions of the output image, the appearance of that selected region is based on the degree of indicated importance of that selected region.

11. The graphic processing apparatus of claim 1, wherein the appearance alterer is a region-color alterer that differentiates appearance attributes from each other among each of the plurality of selected regions based on at least one appearance-arrangement rule.

12. The graphic processing apparatus of claim 11, wherein:

the at least one appearance attribute is a color attribute; and differences in the color attribute used to differentiate the plurality of selected regions from one another is at least one of differences in density, differences in chroma and differences in hue.

13. The graphic processing apparatus of claim 12, wherein the at least one appearance-arrangement rule comprises altering any of the plurality of selected regions having an area larger than a reference area in appearance with a region color having a low density, and altering any of the plurality of selected regions having an area smaller than the reference area in appearance with a region color having a high density.

14. The graphic processing apparatus of claim 13, wherein the at least one appearance arrangement rule comprises altering any of the plurality of selected regions having an area larger than a reference area in appearance with a non-vivid region color having a low density, and altering any of the plurality of selected regions having an area smaller than the reference area in appearance with a vivid region color having a high density.

15. The graphic processing apparatus of claim 12, wherein the at least one region-appearance arrangement rule comprises altering any of the plurality of selected regions having an area larger than a reference area in appearance with a region color having a low chroma, and altering any of the plurality of selected regions having an area smaller than the reference area in appearance with a region color having a high chroma.

16. The graphic processing apparatus of claim 12, wherein the at least one appearance-arrangement rule comprises altering each of the plurality of selected regions having an area larger than a reference area in appearance with a non-vivid region color, and altering each of the plurality of selected regions having an area smaller than the reference area in appearance with a vivid region color.

17. The graphic processing apparatus of claim 12, wherein the at least one appearance-arrangement rule comprises gradually decreasing the density of a color to be applied to each of the plurality of selected regions as the area of the selected region increases.

18. The graphic processing apparatus of claim 12, wherein the at least one appearance-arrangement rule comprises gradually decreasing the chroma of a color to be applied to any of the plurality of selected regions as the area of the selected region increases.

19. The graphic processing apparatus of claim 12, wherein the at least one appearance-arrangement rule comprises gradually decreasing the density and the chroma of a color to be applied to any of the plurality of selected regions as the area of the selected regions increase.

20. A digital copier that graphically alters appearances of each of the selected regions of a document, comprising:

a scanner that scans a document and outputs the image;

an image forming device that forms the output image; and the graphic processing apparatus of claim 1.

21. A method for graphically altering appearances of a plurality of regions of an image, comprising:

storing the image in memory;

selecting a plurality of regions of the stored image;

altering at the same time the plurality of selected regions such that each selected region has an appearance different than the other selected regions; and outputting an output image, wherein each selected region of the output image has the altered appearance.

22. The method of claim 21, further comprising selecting at least one appearance attribute to be altered.

23. The method of claim 22, wherein the at least one appearance attribute is at least one of color and hatching.

24. The method of claim 21, wherein the appearances of the plurality of selected regions are differentiated in accordance with areas of the selected regions.

25. The method of claim 21, further comprising displaying the stored document on a graphical user interface.

26. The method of claim 25, wherein the regions are selected by a user using the graphical user interface.

27. The method of claim 25, further comprising categorizing each of the selected regions, wherein:

each selected region is placed into one of at least one category; and the graphical user interface has at least one icon for assigning each selected region to the at least one category.

28. The method of claim 25, further comprising:

specifying categories in a sub-window of the graphical user interface; and allowing a user to categorize the selected regions wherein a first region is included in a first category and a second region is included in a second category.

29. The method of claim 28, further comprising altering appearance of the selected regions grouped in the first category and the second category with the same attribute in accordance with rules applicable to the first category and the second category.

30. The method of claim 21, further comprising differentiating each of the selected regions by importance.

31. The method of claim 21, further comprising applying different hatching patterns to the selected regions.

32. The method of claim 21, further comprising applying different colors to the selected regions.

33. A graphic processing apparatus that changes the appearances of selected regions of an image, comprising:

memory means for temporarily storing the image;

region selecting means for selecting a plurality of regions of the image;

appearance altering means for altering an appearance of each of the plurality of selected regions at the same time, the altered appearances of the plurality of selected regions being different from one another; and output means for outputting the image, the selected regions of the output image having the altered appearance.

34. The graphic processing apparatus of claim 33, wherein the plurality of region appearances are differentiated by at least one of color and hatching.

35. The graphic processing apparatus of claim 33, wherein the hatching is at least one of hatching designs and hatching patterns.

36. The graphic processing apparatus of claim 35, wherein the hatching designs and hatching patterns are differentiated by hatching density.

37. The graphic processing apparatus of claim 36, wherein the difference in hatching density is at least one of a difference in dot density, a difference in hatching segment gap, a difference in hatching-line thickness and a difference in hatching-overlap count.

38. The graphic processing apparatus of claim 33, further comprising region appearance selecting means for selecting the appearance for each of the plurality of selected regions based on at least one of an area and an importance of that selected region.

39. The graphic processing apparatus of claim 38, further comprising means for categorizing each of the plurality of selected regions into one of at least one category, a characteristic of each category based on the at least one of the area and the importance of each of the at least one selected region included in that category, wherein the at least one category is differentiated from one another by differences in the characteristic of the at least one category.

40. The graphic processing apparatus of claim 33, wherein the appearance altering means is a region-color alterer for differentiating appearance attributes from each other among each of the plurality of selected regions based on at least one appearance-arrangement rule.

41. The graphic processing apparatus of claim 40, wherein:

the at least one appearance attribute is a color attribute; and differences in the color attribute used to differentiate the plurality of selected regions from one another is at least one of differences in density, differences in chroma and differences in hue.

42. The graphic processing apparatus of claim 41, wherein the at least one appearance-arrangement rule prescribe that any of the plurality of selected regions having an area larger than a reference area shall be altered in appearance with a region color having a low density while any of the plurality of selected regions having an area smaller than the reference area shall be altered in appearance with a region color having a high density.

43. A digital copier for graphically altering the appearances of each of the selected regions of a document, comprising:

scanning means for scanning a document and for outputting the image;

image forming means for forming the output image; and the graphic processing apparatus of claim 33.

* * * * *